(12) United States Patent
Yoshizumi

(10) Patent No.: US 8,908,916 B2
(45) Date of Patent: Dec. 9, 2014

(54) CONTROL APPARATUS, CONTROL METHOD, AND PROGRAM TO SEARCH FOR A SUBJECT AND AUTOMATICALLY PERFORM IMAGE-RECORDING

(75) Inventor: Shingo Yoshizumi, Tokyo (JP)

(73) Assignee: Sony Corporation, Tokyo (JP)

( * ) Notice: Subject to any disclaimer, the term of this patent is extended or adjusted under 35 U.S.C. 154(b) by 234 days.

(21) Appl. No.: 13/384,898

(22) PCT Filed: Jul. 22, 2010

(86) PCT No.: PCT/JP2010/062299
§ 371 (c)(1),
(2), (4) Date: Jan. 19, 2012

(87) PCT Pub. No.: WO2011/013562
PCT Pub. Date: Feb. 3, 2011

(65) Prior Publication Data
US 2012/0121134 A1 May 17, 2012

(30) Foreign Application Priority Data
Jul. 29, 2009 (JP) .................................. 2009-176625

(51) Int. Cl.
*G06K 9/00* (2006.01)
*H04N 5/232* (2006.01)
*H04N 5/77* (2006.01)

(52) U.S. Cl.
CPC ............. *H04N 5/232* (2013.01); *H04N 5/772* (2013.01)
USPC ........................................................ 382/103

(58) Field of Classification Search
None
See application file for complete search history.

(56) References Cited

U.S. PATENT DOCUMENTS

| 6,917,384 | B1 | 7/2005 | Fukushima | |
|---|---|---|---|---|
| 2004/0100563 | A1* | 5/2004 | Sablak et al. | 348/211.4 |
| 2006/0114331 | A1* | 6/2006 | Tamamura | 348/208.13 |
| 2009/0027518 | A1* | 1/2009 | Kita | 348/231.99 |
| 2009/0066803 | A1* | 3/2009 | Miyata | 348/222.1 |
| 2009/0102942 | A1 | 4/2009 | Yoshizumi et al. | |
| 2009/0103778 | A1 | 4/2009 | Yoshizumi et al. | |

(Continued)

FOREIGN PATENT DOCUMENTS

| JP | 11 112852 | 4/1999 |
|---|---|---|
| JP | 2000 358183 | 12/2000 |

(Continued)

OTHER PUBLICATIONS

International Search Report issued on Aug. 31, 2010 in PCT/JP10/062299 filed on Jul. 22, 2010.

(Continued)

*Primary Examiner* — Atiba O Fitzpatrick
(74) *Attorney, Agent, or Firm* — Oblon, Spivak, McClelland, Maier & Neustadt, L.L.P.

(57) ABSTRACT

The present invention relates to a control apparatus, a control method, and a program in which, when performing automatic image-recording, the frequency with which image-recording is performed can be changed so that the recording frequency can be suitably changed in accordance with, for example, a user's intention or the state of an imaging apparatus.
In the imaging apparatus, the recording frequency can be changed and set in accordance with, for example, a user operation. In accordance with this, a predetermined parameter related to automatic image-recording is changed and set internally, so that an operation reflecting the recording frequency can be obtained as actual automatic image-recording.

14 Claims, 22 Drawing Sheets

(56) References Cited

U.S. PATENT DOCUMENTS

| | | |
|---|---|---|
| 2009/0256925 A1 | 10/2009 | Yoshizumi |
| 2009/0268943 A1 | 10/2009 | Yoshizumi |
| 2009/0322896 A1 | 12/2009 | Yoshizumi |
| 2010/0073497 A1 | 3/2010 | Katsumata et al. |
| 2010/0157075 A1 | 6/2010 | Yoshizumi |
| 2010/0328467 A1 | 12/2010 | Yoshizumi |
| 2010/0328524 A1 | 12/2010 | Yoshizumi |
| 2011/0019012 A1 | 1/2011 | Yoshizumi |
| 2011/0019021 A1 | 1/2011 | Yoshizumi |
| 2011/0025854 A1 | 2/2011 | Yoshizumi |
| 2011/0157394 A1 | 6/2011 | Yoshizumi |
| 2011/0157397 A1 | 6/2011 | Yoshizumi |
| 2011/0181687 A1 | 7/2011 | Yoshizumi |
| 2011/0181690 A1 | 7/2011 | Yoshizumi |
| 2011/0216159 A1 | 9/2011 | Yoshizumi |
| 2011/0216225 A1 | 9/2011 | Yoshizumi |
| 2012/0002075 A1 | 1/2012 | Yoshizumi et al. |

FOREIGN PATENT DOCUMENTS

| | | |
|---|---|---|
| JP | 2005 44032 | 2/2005 |
| JP | 2006 19828 | 1/2006 |
| JP | 2006 203689 | 8/2006 |
| JP | 2008 78951 | 4/2008 |
| JP | 2009 100300 | 5/2009 |

OTHER PUBLICATIONS

U.S. Appl. No. 14/062,599, filed Oct. 24, 2013, Yoshizumi.

* cited by examiner

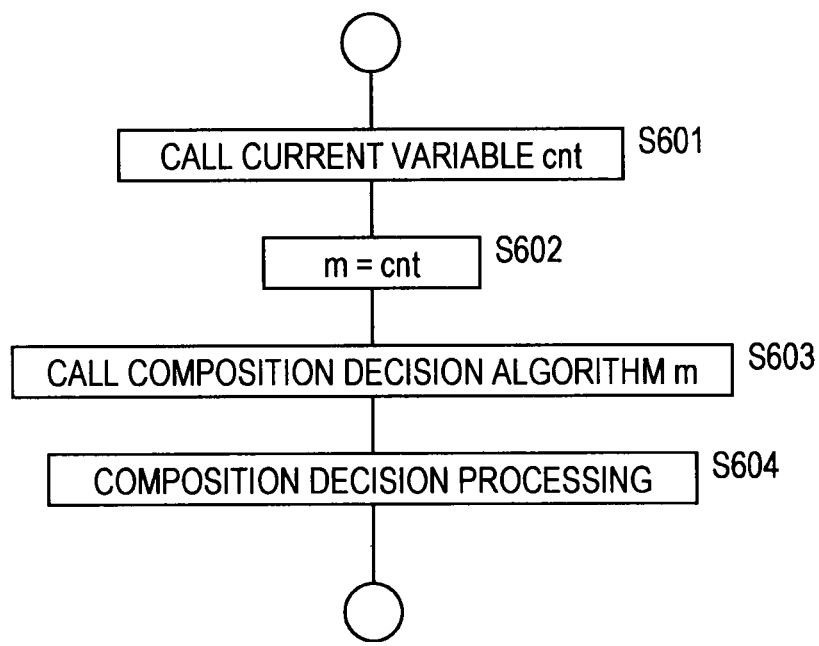

CONTROL APPARATUS, CONTROL METHOD, AND PROGRAM TO SEARCH FOR A SUBJECT AND AUTOMATICALLY PERFORM IMAGE-RECORDING

TECHNICAL FIELD

The present invention relates to a control apparatus for searching for, for example, a subject, and automatically performing image-recording, and to a method for the control apparatus. Also, the present invention relates to a program for causing the control apparatus to execute necessary steps.

BACKGROUND ART

The applicant of the present invention previously proposed a configuration for performing automatic image-recording, as disclosed in PTL 1. That is, in this configuration, a subject contained in an image represented by captured image data obtained by an imaging apparatus is detected, and the detected subject is subjected to image-recording.

CITATION LIST

Patent Literature

PTL 1: Japanese Unexamined Patent Application Publication No. 2009-100300

SUMMARY OF INVENTION

Technical Problem

In the invention of the present application, an object thereof is to further improve the above-described automatic image-recording operation by providing useful functions for users.

Solution to Problem

Accordingly, in view of the above-described problem, a control apparatus of the present invention is configured as follows.

That is, the control apparatus includes: image-recording control means for performing control so that automatic image-recording for automatically recording, on recording means, image data which has been obtained based on imaging by using an imaging unit is continuously and repeatedly performed; recording-frequency setting means for changing and setting a recording frequency, which is a frequency of the automatic image-recording performed by the image-recording control means; and parameter changing/setting means for changing and setting a parameter related to the automatic image-recording in accordance with the recording frequency set by the recording-frequency setting means.

With the above-described configuration, a predetermined parameter related to automatic image-recording is changed and set in accordance with the changing and setting of the recording frequency. Thus, an operation reflecting the recording frequency can be obtained as actual automatic image-recording.

Advantageous Effects of Invention

That is, according to the invention of the present application, as automatic image-recording, the frequency with which image-recording is performed can be changed. Thus, the recording frequency is suitably changed in accordance with a user's intention or the state of an imaging apparatus, thereby further improving automatic image-recording functions.

BRIEF DESCRIPTION OF DRAWINGS

FIG. 17 is a flowchart illustrating an example of an algorithm for changing a composition decision algorithm.

FIG. 18 is a view illustrating, as a fourth embodiment, a changing and setting example when a composition forming element is a frequency-associated parameter.

DESCRIPTION OF EMBODIMENTS

Figure 1:
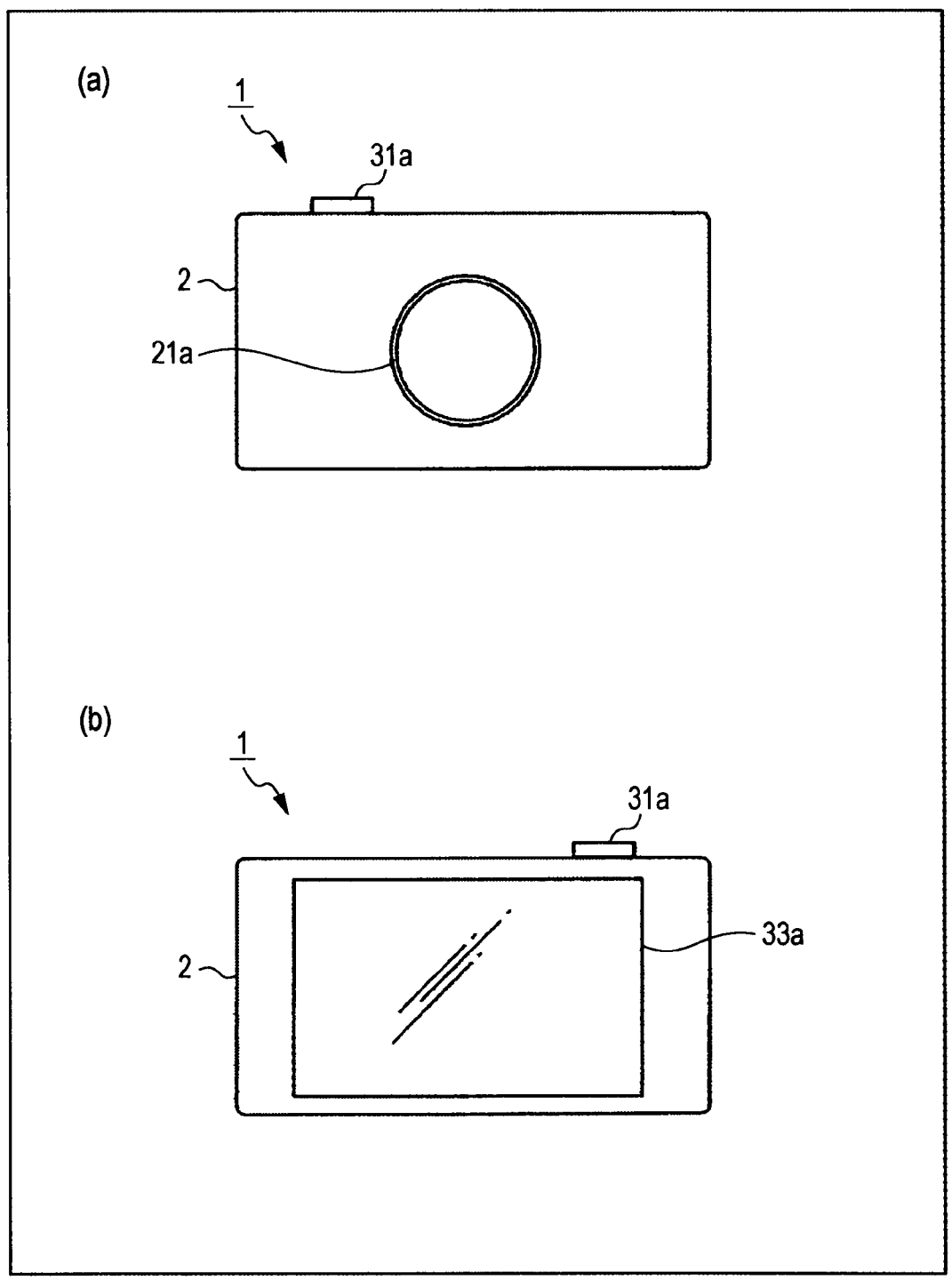
FIG. 1, which includes a front view and a rear view, simply illustrates outer appearances of a digital still camera, which is an imaging apparatus forming an imaging system of an embodiment.

Hereinafter, modes for carrying out the invention of the present application (hereinafter referred to as "embodiments") will be described in the following order.
<1. Configuration of Imaging System>
 [1-1. Overall Configuration]
 [1-2. Digital Still Camera]
 [1-3. Pan/Tilt Head]
<2. Examples of Functional Configurations Corresponding to Composition Control of Embodiment>
<3. Example of Basic Algorithm for Automatic Image-Recording>
<4. Example of Frequency Changing/Setting Processing>
<5. Example of Frequency-Associated Parameter (First Embodiment)>
<6. Example of Frequency-Associated Parameter (Second Embodiment)>
<7. Example of Frequency-Associated Parameter (Third Embodiment)>
<8. Example of Frequency-Associated Parameter (Fourth Embodiment)>
<9. Example of Frequency-Associated Parameter (Fifth Embodiment)>
<10. Example of Frequency-Associated Parameter (Sixth Embodiment)>
<11. Example of Frequency-Associated Parameter (Seventh Embodiment)>
<12. Automatic Frequency Changing/Setting Processing (First Example)>
<13. Automatic Frequency Changing/Setting Processing (Second Example)>
<14. Modified Examples of Imaging System of Present Embodiment>

Also, in the present specification, in the following description, the following terms, such as frame, angle of view, imaging field-of-view range, and composition, will be used.

The frame is an area range corresponding to one screen which can fit an image therein, and generally has an outer frame configuration, such as a vertically oriented rectangle or a horizontally oriented rectangle.

The angle of view, which is also called a zoom angle, expresses, by an angle, a range of a frame which is determined by the position of a zoom lens in an optical system of an imaging apparatus. Generally, the angle of view is determined by the focal length of an imaging optical system and the size of an image plane (image sensor or film). Here, an element which is changeable in accordance with the focal length is called an angle of view.

The imaging field-of-view range concerns the range of a frame of an image captured by an imaging apparatus placed at a fixed position, the range being determined by, in addition to the above-described angle of view, an angle in a pan (horizontal) direction and angles (elevation angle and depression angle) in a tilt (vertical) direction.

The composition, which is here also called framing, is a positioning state including, for example, the setting of the size of a subject in a frame which is determined by the imaging field-of-view range.

Also, in the present embodiment, the configuration based on the invention of the present application is applied to, by way of example, an imaging system including a digital still camera and a pan/tilt head to which this digital still camera is attached.

<1. Configuration of Imaging System>
 [1-1. Overall Configuration]

An imaging system of the present embodiment includes a digital still camera 1 and a pan/tilt head 10 on which this digital still camera 1 is placed.

An example of the outer appearance of the digital still camera 1 is first shown in FIG. 1. Part (a) and part (b) of FIG. 1 are a front view and a rear view, respectively, illustrating the digital still camera 1.

The digital still camera 1 shown in those views includes, as shown in part (a) of FIG. 1, a lens unit 21a at the front side of a main body unit 2. This lens unit 21a is exposed to the outside of the main body unit 2, as part of an imaging optical system.

Also, a release button 31a is provided at the top portion of the main body unit 2. In an imaging mode, an image (captured image) captured by the use of the lens unit 21a is generated as an image signal. Then, if an operation is performed on the release button 31a during the imaging mode, a captured image obtained when such an operation has been performed is recorded on a storage medium as image data representing a still image. That is, a photographic operation is performed.

The digital still camera 1 also includes, as shown in part (b) of FIG. 1, a display screen unit 33a at the rear side of the digital still camera 1.

On this display screen unit 33a, in the imaging mode, an image which is being captured by the lens unit 21a during the imaging mode, which is called a through image, is displayed. In the playback mode, image data recorded on the storage medium is displayed. Further, an operation image is displayed as a GUI (Graphical User Interface) in accordance with an operation performed on the digital still camera 1 by a user.

It is noted that the digital still camera 1 of the present embodiment is provided with a touch panel on the display screen unit 33a. With this provision, the user is able to perform a certain operation by touching the display screen unit 33a with his/her finger.

Also, the imaging system (imaging apparatus) of the present embodiment includes an imaging unit, which serves as the digital still camera 1, and a movable mechanism unit (movable apparatus, which serves as a pan/tilt head 10, which will be described next. However, the user is able to perform a photographic operation by only using the digital still camera 1, as in a general digital still camera.

Figure 2:
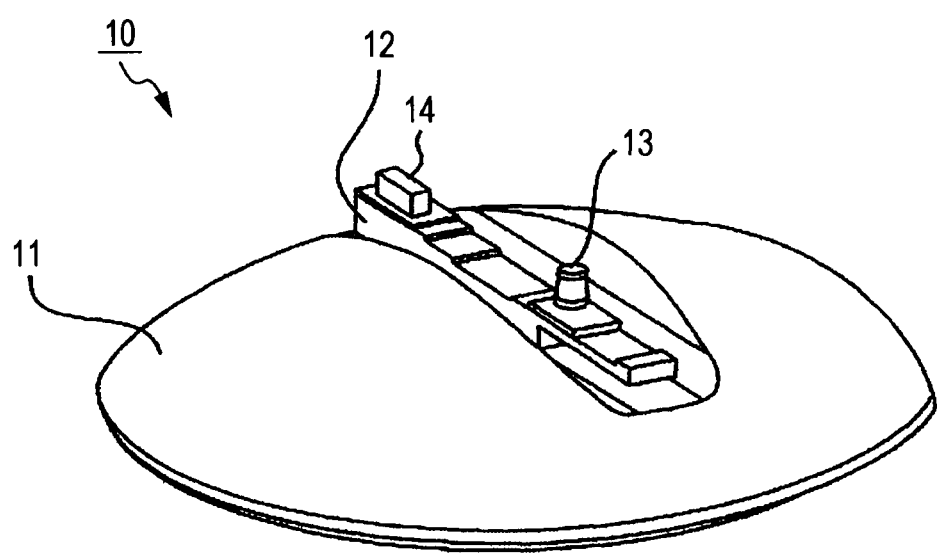
FIG. 2 is a perspective view illustrating an example of the outer appearance of a pan/tilt head forming the imaging system of the embodiment.
Figure 3:
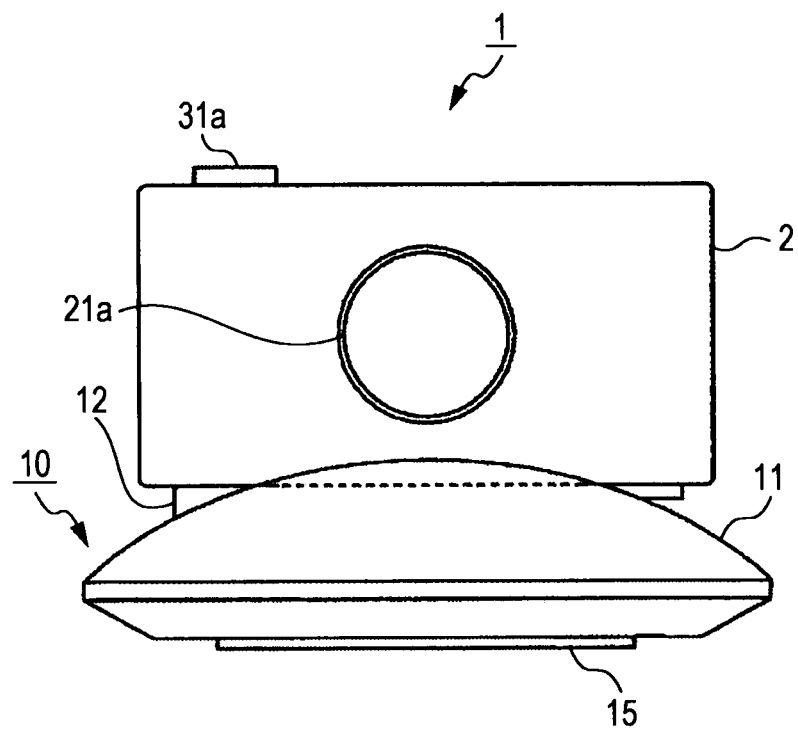
FIG. 3 is a front view illustrating, as the imaging system of the embodiment, an example of the form in which a digital still camera is attached to a pan/tilt head.
Figure 4:
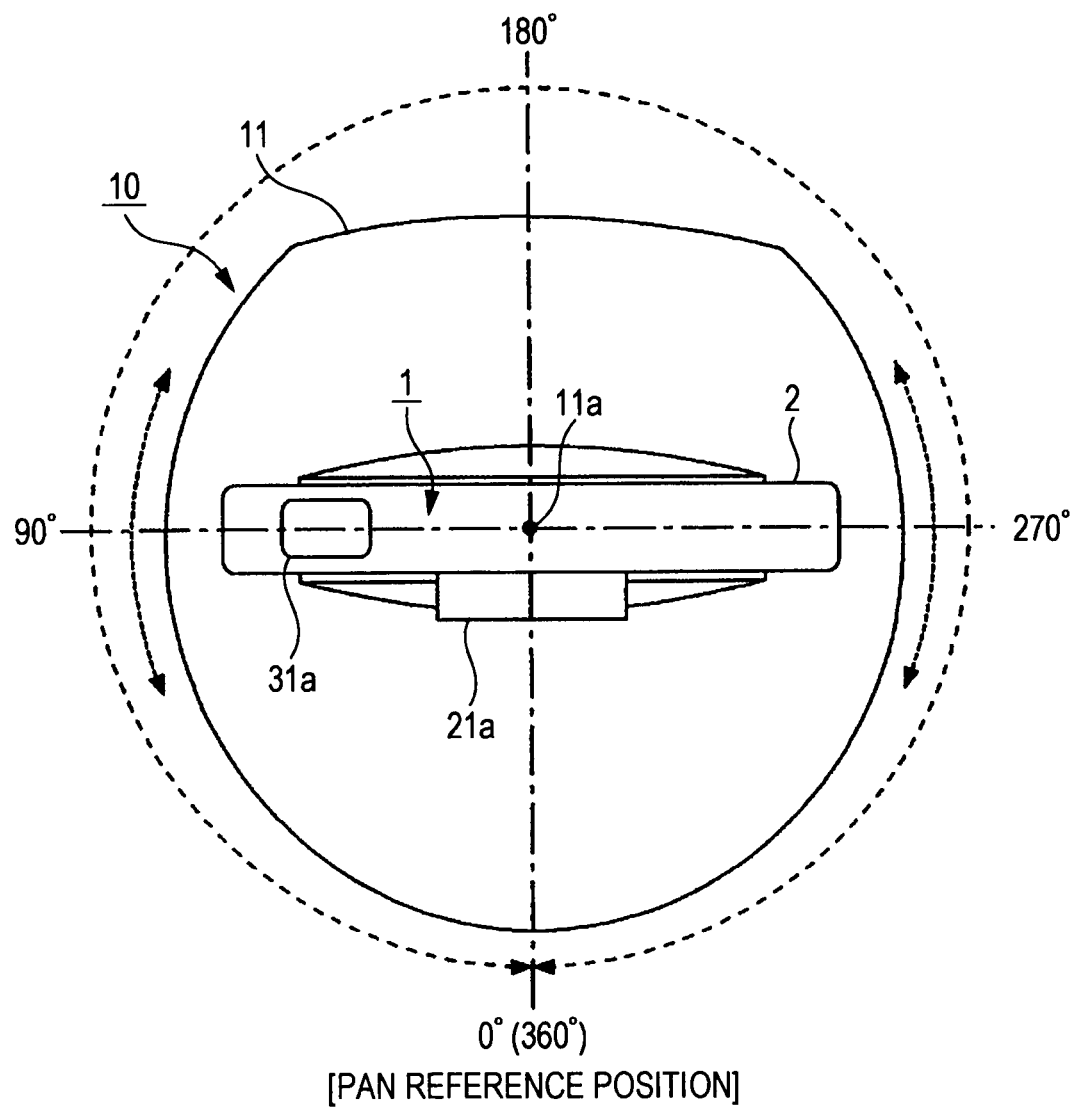
FIG. 4 is a plan view illustrating, as the imaging system of the embodiment, an example of the form in which a digital still camera is attached to a pan/tilt head, together with an example of a mode of the movement in the pan direction.
Figure 5:
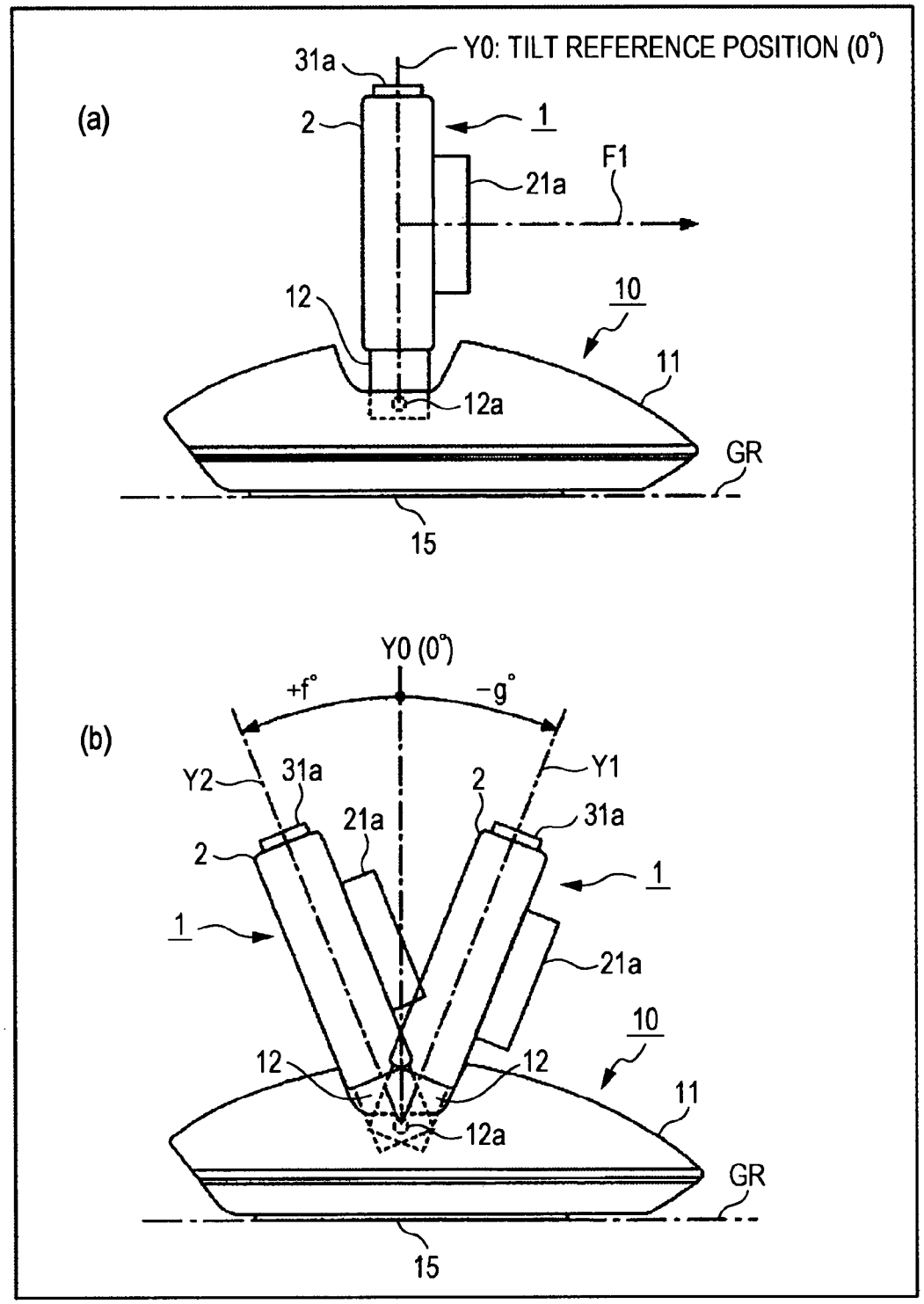
FIG. 5, which includes side views, illustrates, as the imaging system of the embodiment, an example of the form in which a digital still camera is attached to a pan/tilt head.

FIG. 2 is a perspective view illustrating the outer appearance of the pan/tilt head 10. FIGS. 3 through 5 illustrate, as outer appearances of the imaging system of the present embodiment, the states in which the digital still camera 1 is placed on the pan/tilt head 10 in suitable states. FIG. 3 is a front view, FIG. 4 is a plan view, and part (a) of FIG. 5 is a side view. Part (b) of FIG. 5 is a side view illustrating a movable range of a tilt mechanism.

As shown in FIGS. 2, 3, 4, and part (a) of FIG. 5, roughly speaking, the pan/tilt head 10 has a structure in which a main body unit 11 is placed on a grounding stand unit 13 and in which a camera stand unit 12 is attached to the main body unit 11.

When placing the digital still camera 1 on the pan/tilt head 10, the bottom side of the digital still camera 1 is placed on the top side of the camera stand unit 12.

In this case, as shown in FIG. 2, a projection 13 and a connector 14 are provided at the top side of the camera stand unit 12.

A hole, which is to be engaged with the projection 13, is formed at the bottom side of the main body unit 2 of the digital still camera 1, though it is not shown. In the state in which the digital still camera 1 is correctly placed on the camera stand unit 12, this hole is engaged with the projection 13. In this state, if a panning/tilting operation is normally performed, the digital still camera 1 is not displaced from or does not come off the pan/tilt head 10.

Also, a connector is provided at a predetermined position of the bottom side of the digital still camera 1. In the state in which the digital still camera 1 is correctly placed on the camera stand unit 12, as described above, the connector of the digital still camera 1 and the connector 14 of the pan/tilt head 10 are connected to each other so that at least inter-communication is ready to be performed.

It is noted that, in reality, the connector 14 and the projection 13, for example, are movable on the camera stand unit 12. On that basis, by the use of an adaptor that matches the configuration of the bottom side of the digital still camera 1, different types of digital still cameras can be placed on the camera stand unit 12 in the state in which they can communicate with the pan/tilt head 10.

Also, communication between the digital still camera 1 and the camera stand unit 12 may be performed wirelessly.

Also, in the state in which the digital still camera 1 is placed on the pan/tilt head 10, it may be configured such that charging is performed on the digital still camera 1 from the pan/tilt head 10. Further, it may also be configured such that a video signal, for example, a signal of images, which are played back by the digital still camera 1, is also transmitted to the pan/tilt head 10 and is further output from the pan/tilt head 10 to an external monitor device via a cable, wireless communication, etc. That is, the pan/tilt head 10 may be, not only used for changing the imaging field-of-view range of the digital still camera 1, but also provided with functions of a so-called cradle.

Next, the basic movements of the digital still camera 1 in the pan/tilt directions performed by the use of the pan/tilt head 10 will be described.

First, the basic movement in the pan direction is as follows.

In the state in which this pan/tilt head 10 is placed on the floor face, the bottom surface of the grounding stand unit 13 is grounded. In this state, as shown in FIG. 4, the main body unit 11 is adapted to rotate clockwise and counterclockwise about a rotational axis 11a. Accordingly, the imaging field-of-view range of the digital still camera 1 placed on the pan/tilt head 10 is changed in the left-and-right direction (horizontal direction). That is, the panning movement is provided.

On that basis, the pan mechanism of the pan/tilt head 10 in this case has a structure in which it can unlimitedly rotate at an angle of 360° or greater as desired either in the clockwise direction or in the counterclockwise direction.

Also, in the pan mechanism of this pan/tilt head, the reference position in the pan direction is determined.

Here, as shown in FIG. 4, the pan reference position is set to be 0° (360°), and then, the rotation position of the main body unit 11 in the pan direction, i.e., the pan position, is expressed from 0° to 360°.

Also, the basic movement of the pan/tilt head 10 in the tilt direction is as follows.

The movement in the tilt direction is obtained, as shown in part (a) of FIG. 5 and part (b) of FIG. 5, by moving the camera stand unit 12 about a rotational axis 12a in both directions of the elevation angle and the depression angle.

Part (a) of FIG. 5 illustrates a state in which the camera stand unit 12 is placed at the tilt reference position Y0 (0°). In this state, the imaging direction F1 that matches the imaging optical axis of the lens unit 21a (optical system unit) is parallel to the ground surface GR on which the grounding stand unit 13 is grounded.

On that basis, first, in the direction of elevation angle, as shown in part (b) of FIG. 5, the camera stand unit 12 is able to rotate about the rotational axis 12a in a range from the tilt reference position Y0 (0°) to a predetermined maximum rotation angle +f°. In the direction of depression angle, too, the camera stand unit 12 is able to rotate about the rotational axis 12a in a range from the tilt reference position Y0 (0°) to a predetermined maximum rotation angle −g°. In this manner, the camera stand unit 12 moves in a range from the maximum rotation angle +f° to the maximum rotation angle −g° on the basis of the tilt reference position Y0(0°). Accordingly, the imaging field-of-view range of the digital still camera 1 placed on the pan/tilt head 10 (camera stand unit 12) changes in the up-and-down direction (vertical direction). That is, the tilting operation is obtained.

The configurations of the outer appearances of the pan/tilt head 10 shown in FIGS. 2 through 5 are examples only. Other physical configurations and structures may be employed as long as the pan/tilt head 10 is able to move the digital still camera 1 placed on the pan/tilt head 10 in the pan direction and in the tilt direction.

[1-2. Digital Still Camera]

Figure 6:
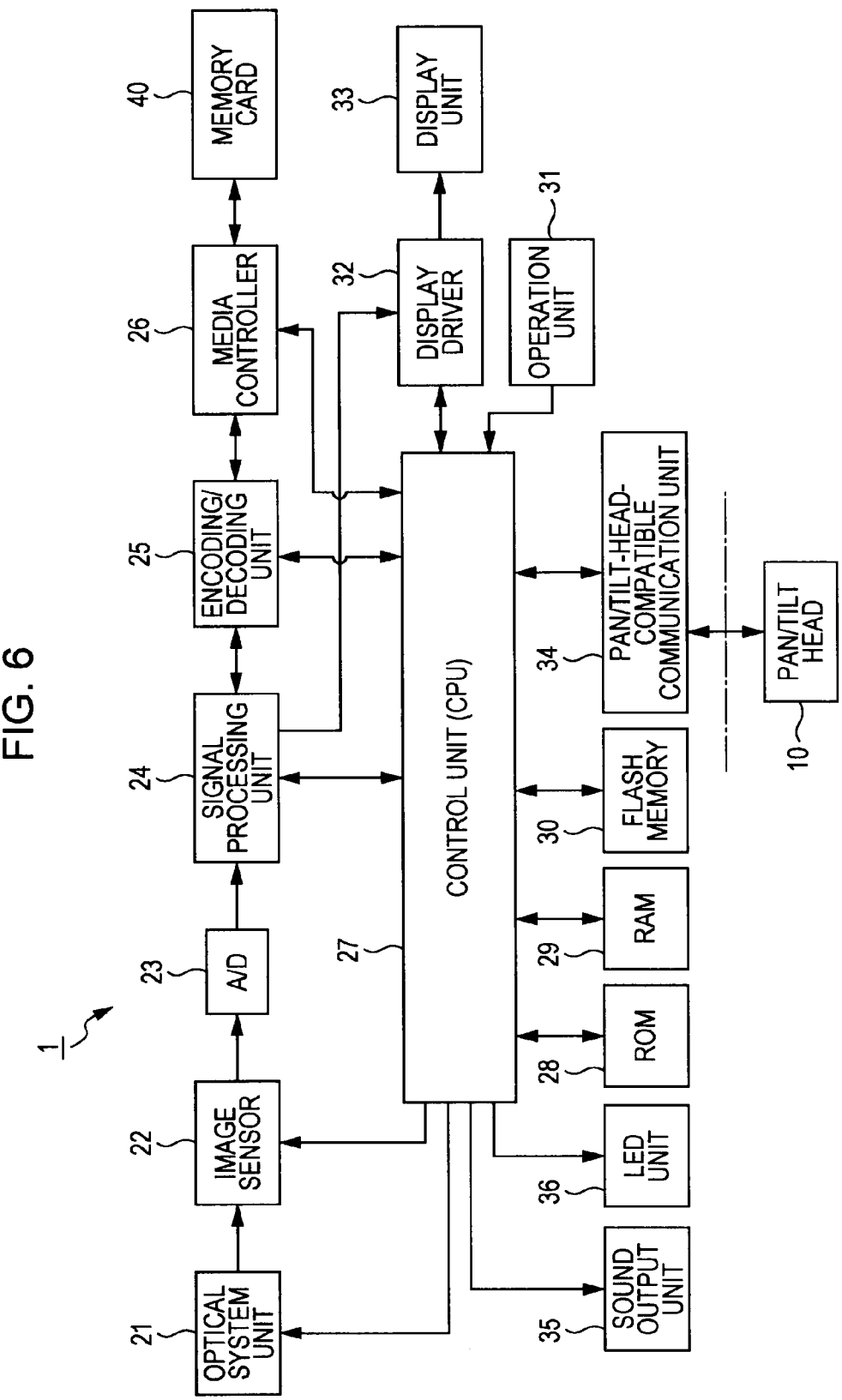
FIG. 6 is a block diagram illustrating an example of the configuration of a digital still camera.

The block diagram of FIG. 6 first illustrates an example of the practical internal configuration of the digital still camera 1.

In this diagram, first, an optical system unit 21 includes an imaging lens group containing a predetermined number of lenses, for example, a zoom lens and a focus lens, and a diaphragm. The optical system unit 21 causes incident light, as imaging light, to be imaged on the light-receiving surface of an image sensor 22.

Also, the optical system unit 21 includes a drive mechanism for driving the above-described zoom lens, focus lens, diaphragm, etc. The operation of the drive mechanism is controlled by so-called camera control, such as zoom (angle of view) control, automatic focusing control, automatic exposure control, executed by, for example, a control unit 27.

The image sensor 22 performs, so-called photoelectric conversion, for converting imaging light obtained by the above-described optical system unit 21 into an electric signal. For this purpose, the image sensor 22 receives imaging light from the optical system unit 21 on the light-receiving surface of a photoelectric conversion device, and sequentially outputs signal charges, which are stored in accordance with the intensity of the received light, at predetermined times. Then, an electric signal (imaging signal) corresponding to the imaging light is output. It is noted that the photoelectric conversion device (imaging device) used as the image sensor 22 is not particularly restricted, and, under the current circumstances, for example, a CMOS sensor or a CCD (Charge Coupled Device), may be used. If a CMOS sensor is used, a device (component) corresponding to the image sensor 22 may include an analog-to-digital conversion unit corresponding to an A/D converter 23, which will be described next.

The imaging signal output from the above-described image sensor 22 is input into the A/D converter 23 where the imaging signal is converted into a digital signal. The digital signal is input into a signal processing unit 24.

The signal processing unit 24 receives the digital imaging signal from the A/D converter 23 in units of, for example, still images (frame images). The signal processing unit 24 then performs required signal processing on the imaging signal which has been input in units of still images as described above, thereby making it possible to generate captured image data (captured still image data), which is image signal data corresponding to one still image.

If the captured image data generated in the signal processing unit 24 as described above is to be recorded, as image information, on a memory card 40, which is a storage medium (storage medium device), the captured image data corresponding to one still image, for example, is output from the signal processing unit 24 to an encoding/decoding unit 25.

The encoding/decoding unit 25 performs compression-encoding on the captured image data in units of still images output from the signal processing unit 24 by using a predetermined still-image compression-encoding method, and then, adds a header, etc. to the captured image data in accordance with, for example, control of the control unit 27, thereby converting the captured image data into image data compressed into a predetermined format. Then, the encoding/decoding unit 25 transfers the image data generated in this manner to a media controller 26. The media controller 26 writes and records the transferred image data on the memory card 40 in accordance with control of the control unit 27. The memory card 40 used in this case is a storage medium that is configured to have an outer shape of, for example, a card format which complies with predetermined standards, and that is configured to contain therein a non-volatile semiconductor storage device, such as a flash memory. It is noted that the type and format other than those of the above-described memory card may be used for the storage medium for storing image data therein.

The signal processing unit 24 in accordance with the present embodiment is configured to execute image processing for detecting a subject, which will be described below, by using captured image data which has been obtained as described above.

Also, the digital still camera 1 causes a display unit 33 to perform image display by using captured image data obtained in the signal processing unit 24, thereby making it possible to display images which are currently captured, so-called through images. For example, the signal processing unit 24 receives an imaging signal output from the A/D converter 23 and generates captured image data corresponding to one still image, as described above. By repeating this operation, the signal processing unit 24 sequentially generates captured image data corresponding to frame images of moving pictures. Then, the signal processing unit 24 transfers the captured image data which has been sequentially generated in this manner to a display driver 32 in accordance with control of the control unit 27. With this operation, through images are displayed.

The display driver 32 generates a drive signal for driving the display unit 33 on the basis of the captured image data input from the signal processing unit 24 as described above, and outputs the drive signal to the display unit 33. Accordingly, in the display unit 33, images based on the captured image data in units of still images are sequentially displayed. When the user views this, images that are being captured are displayed in the display unit 33 as moving pictures. That is, through images are displayed.

Also, the digital still camera 1 plays back image data recorded on the memory card 40 so as to display the images on the display unit 33.

For this purpose, the control unit 27 specifies image data and instructs the media controller 26 to read the data from the memory card 40. In response to this instruction, the media controller 26 accesses the address on the memory card 40 at which the specified image data is recorded, reads the data, and transfers the read data to the encoding/decoding unit 25.

In accordance with control of the control unit 27, for example, the encoding/decoding unit 25 extracts actual data, as compressed still image data, from the captured image data transferred from the media controller 26, and executes decoding processing, which corresponds to the compression-encoding, on this compressed still image data, thereby obtaining captured image data corresponding to one still image. Then, the encoding/decoding unit 25 transfers this captured image data to the display driver 32. Thus, the images represented by the captured image data recorded on the memory card 40 are played back and displayed in the display unit 33.

Also, in addition to the above-described through images and playback images of the image data, user interface images (operation images) can be displayed in the display unit 33. In this case, the control unit 27 generates display image data as a user interface image which is required by the control unit 27, for example, in accordance with the current operation state, and outputs the display image data to the display driver 32. Accordingly, the user interface image is displayed in the display unit 33. It is noted that this user interface image may be displayed as, for example, a specific menu screen, on the display screen of the display unit 33, separately from a monitor image or a playback image of the captured image data, or that the user interface image may be displayed such that it is superposed on or combined with part of the monitor image or the playback image of the captured image data.

In reality, the control unit 27 includes, for example, a CPU (Central Processing Unit), and forms a microcomputer together with a ROM 28, a RAM 29, etc. In the ROM 28, in addition to programs executed by the CPU, which serves as the control unit 27, various items of setting information related to the operation of the digital still camera 1 are stored. The RAM 29 is used as a primary storage device for the CPU.

Also, in this case, a flash memory 30 is provided as a non-volatile storage area, which is used for storing various items of setting information that are necessary to be changed (rewritten) in accordance with, for example, a user operation or an operation log. It is noted that, if a non-volatile memory, typically, a flash memory is used as the ROM 28, instead of the flash memory 30, part of the storage area of the ROM 28 may be used.

An operation unit 31 integrates various operators provided in the digital still camera 1 and an operation-information-signal output section for generating operation information signals in accordance with operations performed on those operators and for outputting the operation information signals to the CPU. The control unit 27 executes predetermined processing in accordance with an operation information signal received from the operation unit 31. Thus, the operation of the digital still camera 1 corresponding to a user operation is performed.

A sound output unit 35 is a section that outputs electronic sound by using a predetermined tone and voice pattern in order to provide, for example, a predetermined content of notification, under the control of the control unit 27.

An LED unit 36 includes an LED (Light Emitting Diode) that protrudes from the front surface of the casing of the digital still camera 1, and a circuit unit that drives this LED so that the LED is turned ON and OFF. The LED unit 26 turns ON or OFF the LED under the control of the control unit 27. A predetermined content of notification is provided in accordance with a pattern obtained by turning ON or OFF this LED.

A pan/tilt-head-compatible communication unit 34 is a section for performing communication between the pan/tilt head 10 and the digital still camera 1 in accordance with a predetermined communication method. The pan/tilt-head-compatible communication unit 34 includes a physical layer configuration that enables wired or wireless sending and receiving of a communication signal with the communication unit of the pan/tilt head 10 in the state in which the digital still camera 1 is attached to the pan/tilt head 10. The pan/tilt-head-compatible communication unit 34 also includes a configuration that implements communication processing corresponding to a predetermined layer higher than the physical layer. The above-described physical layer configuration includes a connector to be connected to the connector 14 shown in FIG. 2.

[1-3. Pan/Tilt Head]

Figure 7:
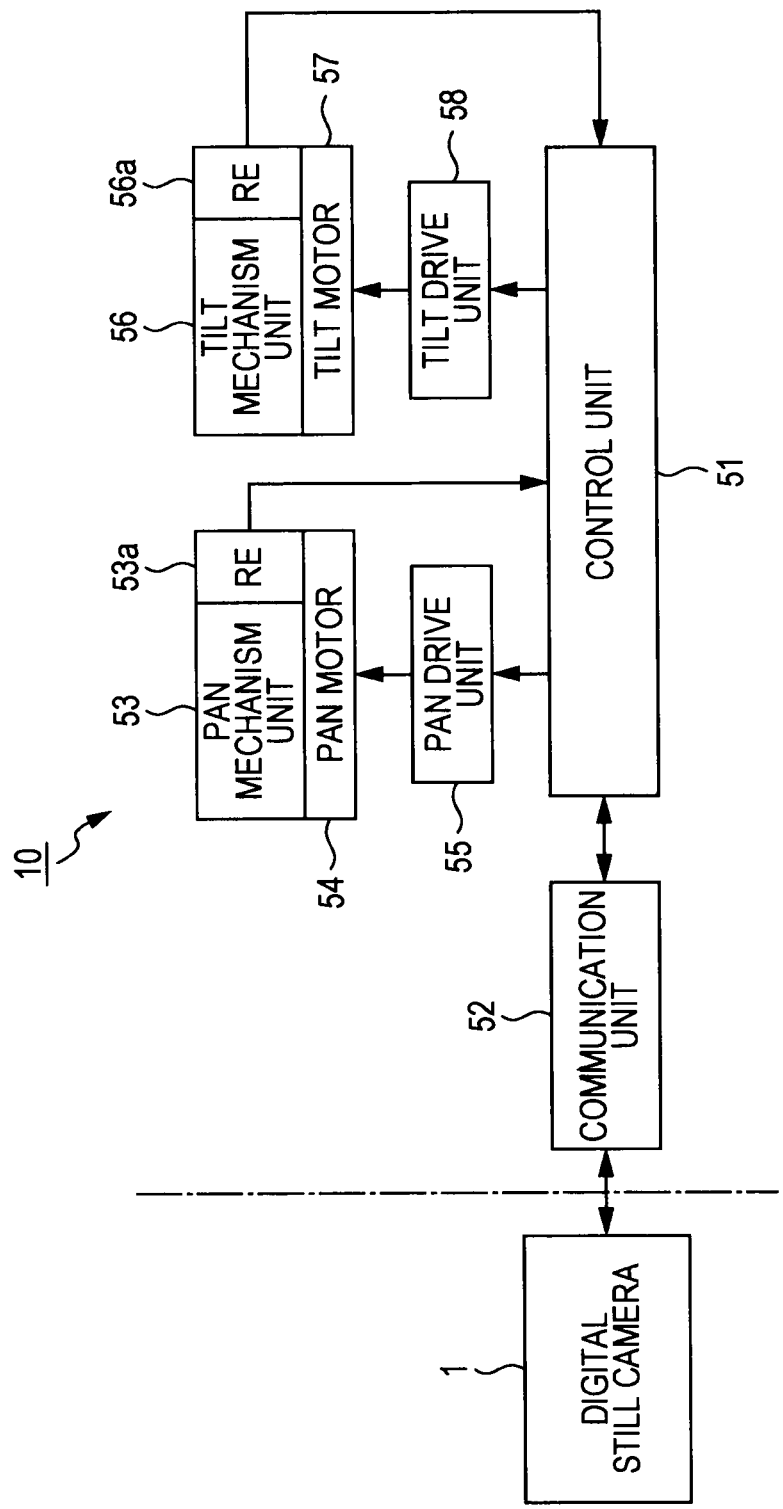
FIG. 7 is a block diagram illustrating an example of the configuration of a pan/tilt head.

The block diagram of FIG. 7 illustrates an example of the internal configuration of the pan/tilt head 10.

As described above, the pan/tilt head 10 includes a pan/tilt mechanism, and, as sections corresponding to the pan/tilt mechanism, the pan/tilt head 10 includes, a pan mechanism unit 53, a pan motor 54, a tilt mechanism unit 56, and a tilt motor 57.

The pan mechanism unit 53 has a mechanism for applying the movement in the pan (horizontal/left-and-right) direction shown in FIG. 4 to the digital still camera 1 which is attached to the pan/tilt head 10. The movement of this mechanism is obtained by causing the pan motor 54 to rotate in the forward direction and in the reverse direction. Similarly, the tilt mechanism unit 56 has a mechanism for applying the movement in the tilt (vertical/up-and-down) direction shown in part (b) of FIG. 5 to the digital still camera 1 which is attached to the pan/tilt head 10. The movement of this mechanism is obtained by causing the tilt motor 57 to rotate in the forward direction and in the reverse direction.

A control unit 51 includes a microcomputer which is formed by a combination of, for example, a CPU, a ROM, a RAM, etc., and controls the movements of the above-described pan mechanism unit 53 and tilt mechanism unit 56. For example, when the control unit 51 controls the movement of the pan mechanism unit 53, it outputs a signal indicating the direction in which the pan mechanism unit 53 is to be moved and the moving speed to a pan drive unit 55. The pan drive unit 55 generates a motor drive signal corresponding to the input signal and outputs the motor drive signal to the pan motor 54. If, for example, a motor is a stepper motor, the motor drive signal is a pulse signal corresponding to PWM control.

This motor drive signal causes the pan motor 54 to rotate, for example, in a required rotation direction at a required rotation speed. As a result, the pan mechanism unit 53 is driven to move in the moving direction at the moving speed corresponding to the rotation direction and the rotation speed, respectively.

Similarly, when the control unit 51 controls the movement of the tilt mechanism unit 56, it outputs a signal indicating a moving direction and a moving speed required for the tilt mechanism unit 56 to a tilt drive unit 58. The tilt drive unit 58 generates a motor drive signal corresponding to the input signal and outputs the motor drive signal to the tilt motor 57. This motor drive signal causes the tilt motor 57 to rotate, for example, in a required rotation direction at a required rotation speed. As a result, the tilt mechanism unit 56 is driven to move in the moving direction at the moving speed corresponding to the rotation direction and the rotation speed, respectively.

The pan mechanism unit 53 also includes a rotary encoder (rotation detector) 53*a*. The rotary encoder 53*a* outputs, to the control unit 51, a detection signal indicating a rotation angle obtained in accordance with the rotation of the pan mechanism unit 53. Similarly, the tilt mechanism unit 56 includes a rotary encoder 56*a*. This rotary encoder 56*a* also outputs, to the control unit 51, a detection signal indicating a rotation angle obtained in accordance with the rotation of the tilt mechanism unit 56.

A communication unit 52 is a section that performs, in accordance with a predetermined communication method, communication with the pan/tilt-head-compatible communication unit 34 provided in the digital still camera 1 attached to the pan/tilt head 10. As in the pan/tilt-head-compatible communication unit 34, the communication unit 52 includes a physical layer configuration that enables wired or wireless sending and receiving of a communication signal to and from the communication unit of the other party. The communication unit 52 also includes a configuration that implements communication processing corresponding to a predetermined layer higher than the physical layer. The above-described physical layer configuration includes the connector 14 of the camera stand unit 12 shown in FIG. 2.

<2. Examples of Functional Configurations Corresponding to Composition Control of Embodiment>

Figure 8:
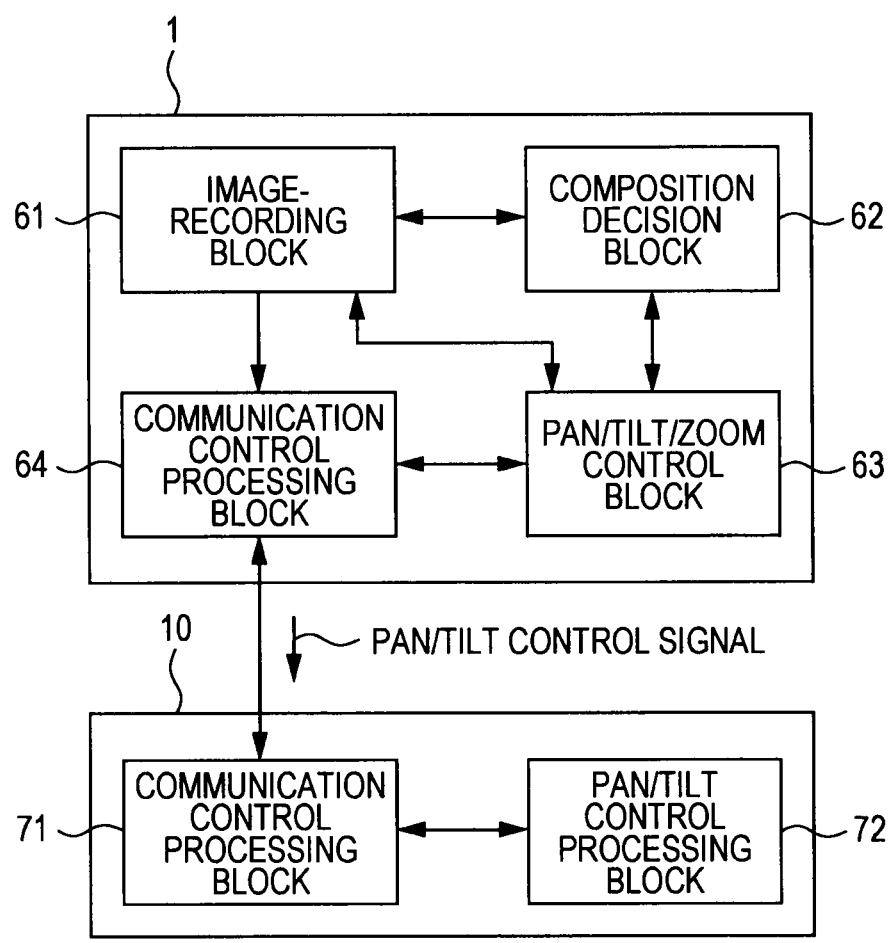
FIG. 8 is a block diagram illustrating the functions provided for a digital still camera of the embodiment to deal with composition control.

Next, examples of the functional configurations, which are implemented by hardware and software (program), of the digital still camera 1 and the pan/tilt head 10 forming the imaging system according to the present embodiment are shown in the block diagram of FIG. 8.

In this diagram, the digital still camera 1 includes an image-recording block 61, a composition decision block 62, a pan/tilt/zoom control block 63, and a communication control processing block 64.

The image-recording block 61 is a section that performs control processing for obtaining a captured image as data of an image signal (captured image data) and for storing this captured image data in a storage medium. This section is a section including, for example, an imaging optical system, an imaging device (image sensor), a signal processing circuit that generates captured image data from a signal output from the imaging device, and a recording control/processing system for writing and recording (storing) the captured image data in a storage medium.

In this case, the recording (image-recording) of captured image data by the image-recording block 61 is performed in accordance with an instruction and control of the composition decision block.

The composition decision block 62 receives and inputs captured image data output from the image-recording block 61. On the basis of this captured image data, the composition decision block 62 first detects a subject and finally executes processing for deciding a composition.

In the present embodiment, when performing this composition decision, attributes, which will be discussed later, are also detected for each of the subjects detected by subject detection. Then, when executing composition decision processing, the optimum composition is decided by utilizing the detected attributes. Further, framing control for obtaining captured image data representing the image content based on the decided composition is also executed.

Subject detection processing (including setting of an initial face frame) executed by the composition decision block 62 can be executed by using the signal processing unit 24 shown in FIG. 6. The subject detection processing performed by the signal processing unit 24 can be implemented by image signal processing by using a DSP (Digital signal Processor). That is, the subject detection processing can be implemented by a program and an instruction supplied to the DSP.

Also, the correction of a face frame, composition decision, and framing control executed by the composition decision block 62 can be implemented as processing executed by the CPU, which serves as the control unit 27, in accordance with a program.

The pan/tilt/zoom control block 63 executes pan/tilt/zoom control in accordance with an instruction from the composition decision block 62 in order to obtain the composition and the imaging field-of-view range corresponding to the decided optimum composition. More specifically, as framing control, the composition decision block 62 specifies, for the pan/tilt/zoom control block 63, the above-described composition and imaging field-of-view range which are to be obtained in accordance with the decided optimum composition. The pan/tilt/zoom control block 63 determines the moving distances of the pan/tilt mechanisms of the pan/tilt head 10 so that the digital still camera 1 faces in the imaging direction in order to obtain the specified composition and imaging field-of-view range. The pan/tilt/zoom control block 63 then generates a pan/tilt control signal for specifying the movement corresponding to the determined moving distances.

The pan/tilt/zoom control block 63 determines the position of the zoom lens (zoom magnification) for obtaining the determined suitable angle of view, and controls a zoom mechanism provided for the image-recording block 61 so that the zoom mechanism is placed at the zoom position.

The communication control processing block 64 is a section for performing communication with a communication control processing block 71 provided in the pan/tilt head 10 in accordance with predetermined communication protocols. A pan/tilt control signal generated by the pan/tilt/zoom control block 63 is sent to the communication control processing block 71 of the pan/tilt head 10 through communication performed by the communication control processing block 64.

The pan/tilt head 10 includes, for example, the communication control processing block 71 and a pan/tilt control processing block 72, as shown in the drawing.

The communication control processing block 71 is a section for performing communication with the communication control processing block 64 of the digital still camera 1, and when receiving the above-described pan/tilt control signal, the communication control processing block 71 outputs this pan/tilt control signal to the pan/tilt control processing block 72.

Among the control processing operations executed by the control unit 51 (microcomputer) of the pan/tilt head 10 shown in FIG. 7, the pan/tilt control processing block 72 serves as a function of executing processing concerning pan/tilt control.

This pan/tilt control processing block 72 controls a pan drive mechanism unit and a tilt drive mechanism unit, which are not shown here, in accordance with an input pan/tilt control signal. With this control, panning/tilting for obtaining a required horizontal viewing angle and a required vertical viewing angle in accordance with the optimum composition is performed.

The pan/tilt/zoom control block 63 is also able to perform pan/tilt/zoom control for searching for a subject in accordance with, for example, a command from the composition decision block 62.

<3. Example of Basic Algorithm for Automatic Image-Recording>

In the imaging system configured as described above, the pan/tilt mechanisms of the pan/tilt head 10 are driven to change the imaging field-of-view range of the digital still camera 1, thereby detecting a subject to be contained within a capturing image. Then, if a subject is detected, it is imaged and recorded in such a manner that it is contained in a frame with a certain composition. That is, an automatic image-recording function is provided.

Figure 9:
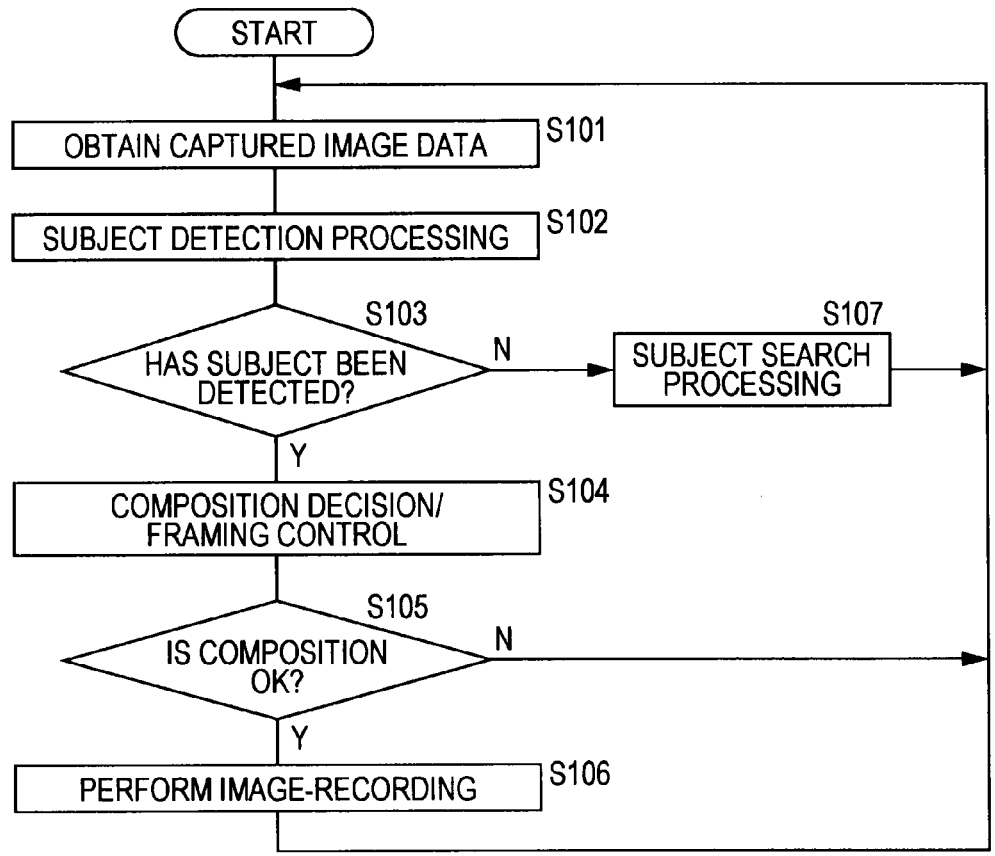
FIG. 9 is a flowchart illustrating an example of an automatic image-recording algorithm, which is the base of the present embodiment.

The flowchart of FIG. 9 is an example of an algorithm for such automatic image-recording. It is noted that the algorithm shown in this diagram is the base of the algorithms corresponding to first through sixth embodiments, which will be described later.

It is noted that the steps shown in this diagram are suitably executed by the functional blocks (image-recording block 61, composition decision block 62, pan/tilt/zoom control block 63, and communication control processing block 64) of the digital still camera 1 shown in FIG. 8.

In FIG. 9, first, in step S101, the composition decision block 62 receives captured image data that is currently obtained by the image-recording block 61. In step S102, the composition decision block 62 executes subject detection processing for the obtained captured image data.

As the subject detection processing in step S102, a face detection technique, for example, may be applied, as described above, and as a detection result thereof, the number of subjects, the sizes of subjects, the positions of subjects in an image, etc., can be obtained.

Then, in step S103, the composition decision block 62 determines whether a subject has been detected as a result of the subject detection processing in the above-described step S102. If a negative determination result is obtained, subject search processing is started in step S107, and the process returns to step S101.

This subject search processing is the following processing. The pan/tilt/zoom control block 63 instructs, through the communication control processing block 64, the pan/tilt head 10 to move in the pan/tilt directions, and also performs zoom control, if necessary, thereby changing the imaging field-of-view range with a predetermined pattern in accordance with the lapse of time. With this control, subjects around the digital still camera 1 are captured in such a manner that they are contained in the imaging field-of-view range.

In contrast, if a positive determination result is obtained in step S103 since a subject has been detected, the process proceeds to step S104.

In step S104, the composition decision block 62 decides the optimum composition for the detected subject, and executes framing control for obtaining the decided composition as the content of an image within the frame of the captured image data.

The elements forming the decided composition here include the size of the subject in the frame, the position of the subject within the frame, etc.

Then, if the framing control has been executed, in step S105, the composition decision block 62 determines whether the currently obtained composition is the decided composition and whether a time is suitable to perform image-recording (whether the composition is OK?).

For example, if it is not determined that the composition is OK even after the lapse of a predetermined time, a negative determination result is obtained in step S105, and the process returns to step S101. In contrast, if a positive determination result is obtained in step S105, the process proceeds to step S106.

In step S106, an instruction to execute image-recording is given to the image-recording block 61. In response to this instruction, the image-recording block 61 performs an operation for recording the currently obtained captured image data on the memory card 40 as a still image file.

According to the algorithm shown in FIG. 9, if a subject is detected, an image-recording operation for recording the detected subject with a certain composition which contains the detected subject is automatically performed. That is, an automatic image-recording operation for automatically recording captured image data representing an image containing, for example, a person, as a subject is obtained.

However, when actually executing the automatic image-recording operation in accordance with the algorithm shown in FIG. 9, the image-recording is continuously repeated with a substantially constant frequency with the lapse of time.

For example, the number of photographs (captured image data) recorded by the automatic image-recording operation that a user wishes to have varies depending on the user's feeling or the user's way of thinking. Also, even for the same user, the number of photographs that the user wishes to have varies depending on the environments and situations in which the imaging system is being used.

From this point of view, it is preferable that at least the frequency with which automatic image-recording is executed be changed and set in response to a user operation. Additionally, if a frequency changing/setting operation is adapted to be performed, it is necessary to construct an imaging system so that the frequency with which the actual image-recording operation is executed can also be suitably changed accordingly.

In the present embodiment, therefore, an imaging system is configured to change the frequency (recording frequency) with which automatic image-recording is executed in response to a user operation. Such an imaging system will be described below.

<4. Example of Frequency Changing/Setting Processing>

Figure 10:
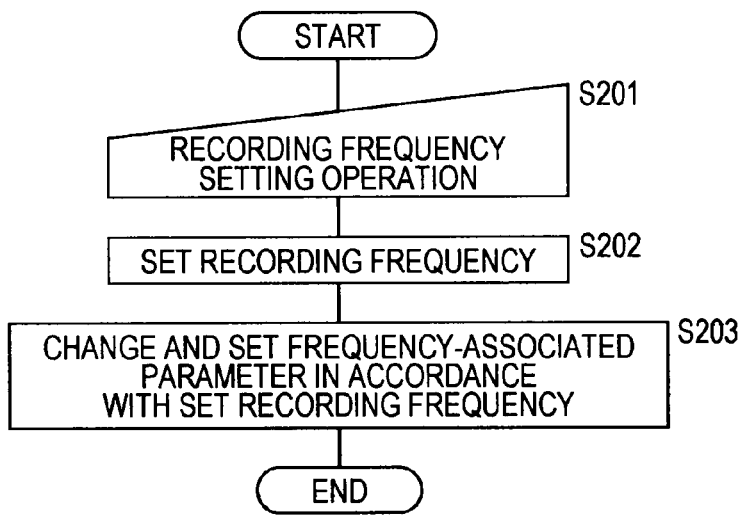
FIG. 10 is a flowchart illustrating an example of processing for changing and setting the recording frequency and the frequency-associated parameter in accordance with the operation.

FIG. 10 illustrates an example of an algorithm for a changing/setting operation for the recording frequency in the imaging system of the present embodiment. The steps shown in this diagram are considered to be executed by the composition decision block 62 of the digital still camera 1 shown in FIG. 8.

In step S201, the composition decision block 62 inputs a setting operation for the recording frequency on the operation unit 31 of the digital still camera 1. In step S202, the composition decision block 62 sets the recording frequency in accordance with the operation for determining the recording frequency. Then, in step S203, the composition decision block 62 executes processing for changing/setting parameters (frequency-associated parameters) to actually change the frequency with which automatic image-recording is to be executed in accordance with the set recording frequency.

Figure 11:
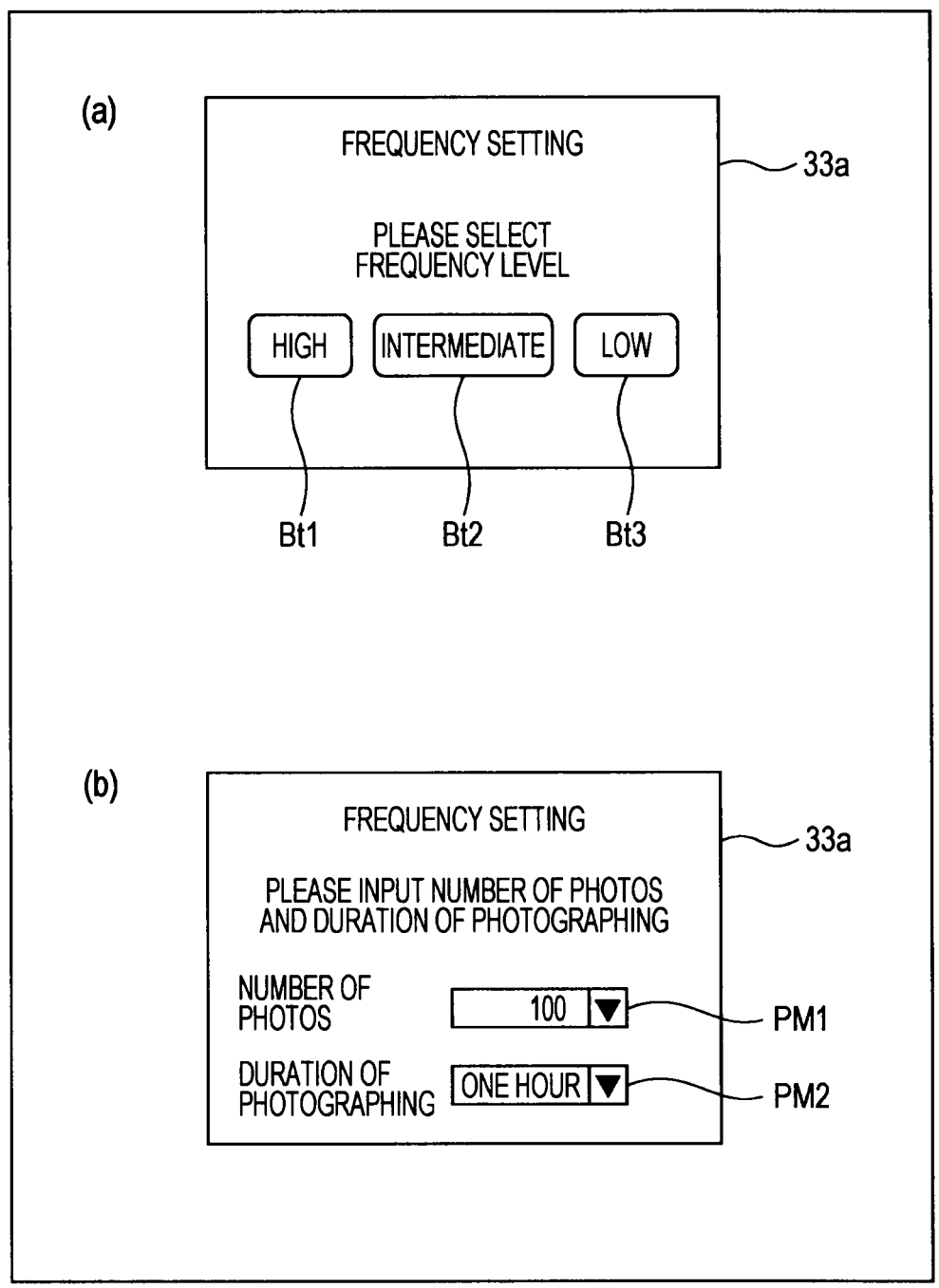
FIG. 11, which includes views illustrating examples of operation screens for performing a recording frequency changing operation.

Part (a) and part (b) of FIG. 11 illustrate examples of user interfaces for setting the recording frequency. Here, part (a) and part (b) of FIG. 11 both illustrate examples of operations to be performed on the recording frequency setting screens, which serve as GUI (Graphical User Interface) screens, displayed on the display screen unit 33a. For example, those recording frequency setting screens can be called by performing a predetermined operation on the display screen unit 33a.

First, on the recording frequency setting screen shown in part (a) of FIG. 11, a "HIGH" button Bt1, an "INTERMEDIATE" button Bt2, and a "LOW" button Bt3 indicating the frequency levels, are shown. That is, in this case, the user is able to select one of the three levels "HIGH", "INTERMEDIATE", and "LOW" as the recording frequency.

When the user wishes to set the frequency to, for example, high, the user performs an operation corresponding to pressing of the "HIGH" button Bt1. With this operation, in step S202 shown in FIG. 10, the level or the frequency indication value is set as the recording frequency corresponding to the "HIGH" level.

On the recording frequency setting screen shown in part (b) of FIG. 11, pull-down menus PM1 and PM2 for specifying and inputting the number of photos and the duration of photographing are displayed.

As the number of photos here, the rough number of photos (number of captured image data elements) which are to be taken during a specified duration of photographing is specified. As the duration of photographing, the time for which automatic image-recording is to be continuously performed is specified.

The user selects and specifies the number of photos and the duration of photographing that the user wishes to have by performing operations on the pull-down menus PM1 and PM2.

In step 202, the composition decision block 62, which has input an operation performed on the recording frequency setting screen shown in part (b) of FIG. 11 in step S201, sets, by using calculation represented by a predetermined arithmetic expression or table data, the level or the frequency indication value as the recording frequency which corresponds to the specified number of photos and the duration of photographing.

The user interfaces for setting the recording frequency are not restricted to the examples shown in FIG. 11. For example, an operation for directly specifying and inputting the value corresponding to a frequency indication value by the user may be considered.

<5. Example of Frequency-Associated Parameter (First Embodiment)>

In the present embodiment, in step S203 shown in FIG. 10, the frequency-associated parameter is changed and set in accordance with the set recording frequency. As the frequency-associated parameter, several parameters may be considered. Hereinafter, examples of frequency parameters will be described in accordance with the first through sixth embodiments.

Figure 12:
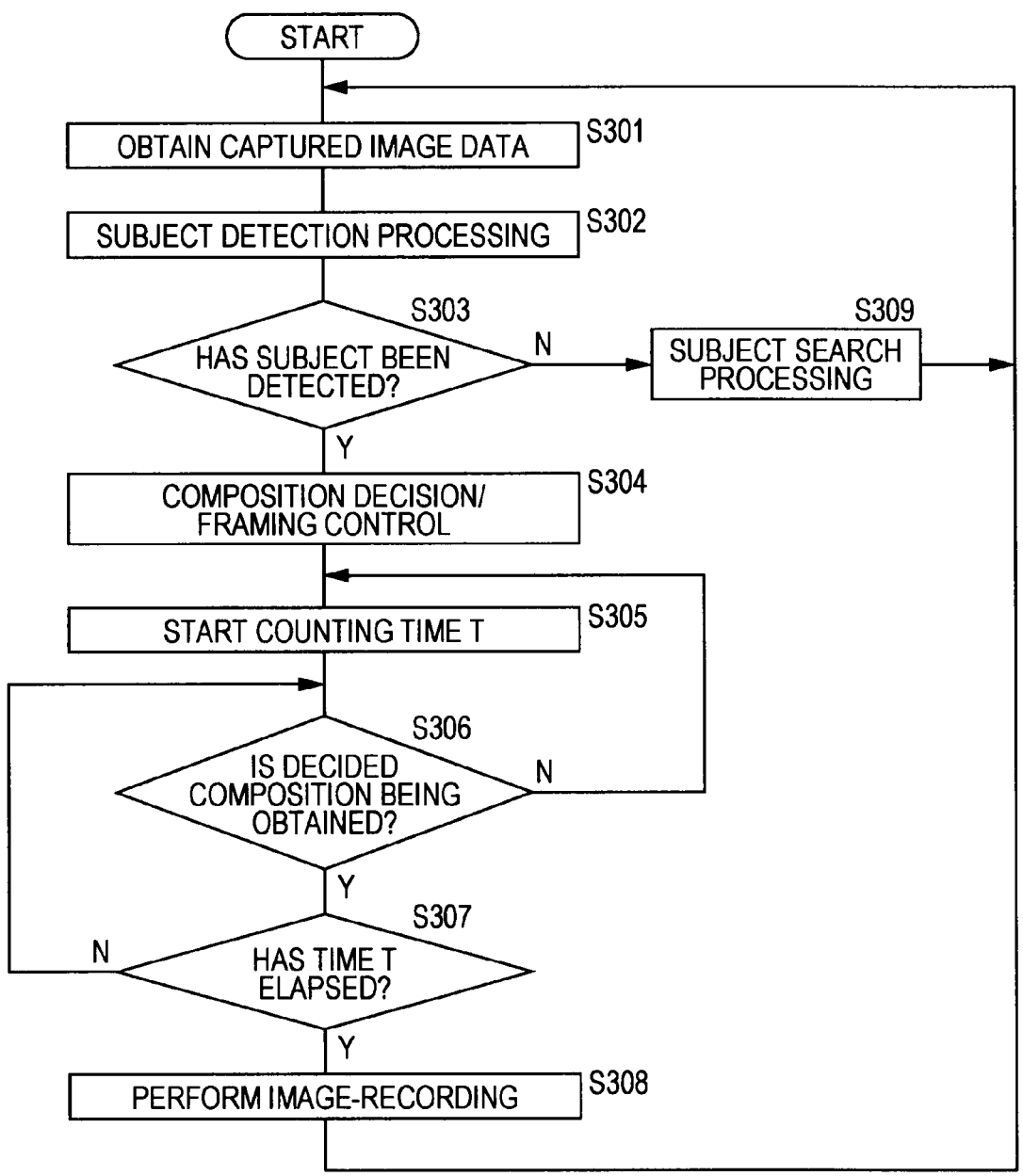
FIG. 12 is a flowchart illustrating, as a first embodiment, an example of an automatic image-recording algorithm using a frequency-associated parameter.

First, the flowchart of FIG. 12 illustrates an example of the automatic image-recording algorithm according to the first embodiment. The algorithm shown in this diagram is based on that shown in FIG. 9.

As the operation obtained from this algorithm, if the state in which the decided composition has been obtained continues for a certain time T after performing framing control, image-recording is then executed. That is, the purpose of this algorithm is to determine the stability of the composition, and is to execute image-recording in the state in which the decided composition is stably obtained. It can be said that the purpose of such an algorithm itself is to record a photograph (captured image data) having a composition as faithful as possible to the decided composition.

In this diagram, steps S301 through S304 and S309 are similar to steps S101 through S104 and S107, respectively, of FIG. 9.

In FIG. 12, after performing framing control in step S304, the counting of time T is started in step S305, and then, it is determined in step S306 whether the decided composition is currently obtained.

Here, for example, even if the decided composition is temporarily obtained after performing framing control in step S304, if the movement, etc. of a subject is comparatively large, the position and the size of the subject in the frame of the captured image obtained in the determination in step S305 may be different from those of the decided composition. In this manner, if the state of the subject in the frame is different from that of the decided composition, a negative determination result is obtained in step S306. In contrast, if the state of the subject is the same as the decided composition since the movement of the subject is almost nothing or very little, a positive determination result is obtained in step S306.

If a positive determination result is obtained in step S306, it is determined in step S307 whether the time T has elapsed. If the time T has not yet elapsed, the process returns to step S306.

If a negative determination result is obtained in step S306, the process returns to step S305, and the counting of the time T is reset and counting is newly started. Although it is not shown here, if a certain period of time has elapsed without obtaining the decided composition by repeating processing for returning from step S306 to step S305, a final decision is made that the decided composition has not been obtained, and the process returns to step S301.

Then, if the composition which is the same as the decided composition in the image represented by the captured image data is maintained for the time T, a positive determination result is obtained in step S307. That is, it is determined that the composition is OK. In this first embodiment, processing of step S305 through S307 corresponds to step S105 of FIG. 9. Then, in step S308, image-recording is performed.

Then, according to the automatic image-recording algorithm of the first embodiment, the time T is treated as the frequency-associated parameter. That is, in the first embodiment, in step S203 of FIG. 10, the time T is changed and set in accordance with the set recording frequency.

In this case, in step S203 of FIG. 10, for example, the time T is set to become shorter as the set frequency becomes higher. As the time T becomes shorter, the time for which the composition is considered to be stable becomes shorter, and it is more likely that image-recording is performed. As a result, the recording frequency becomes high.

<6. Example of Frequency-Associated Parameter (Second Embodiment)>

Figure 13:
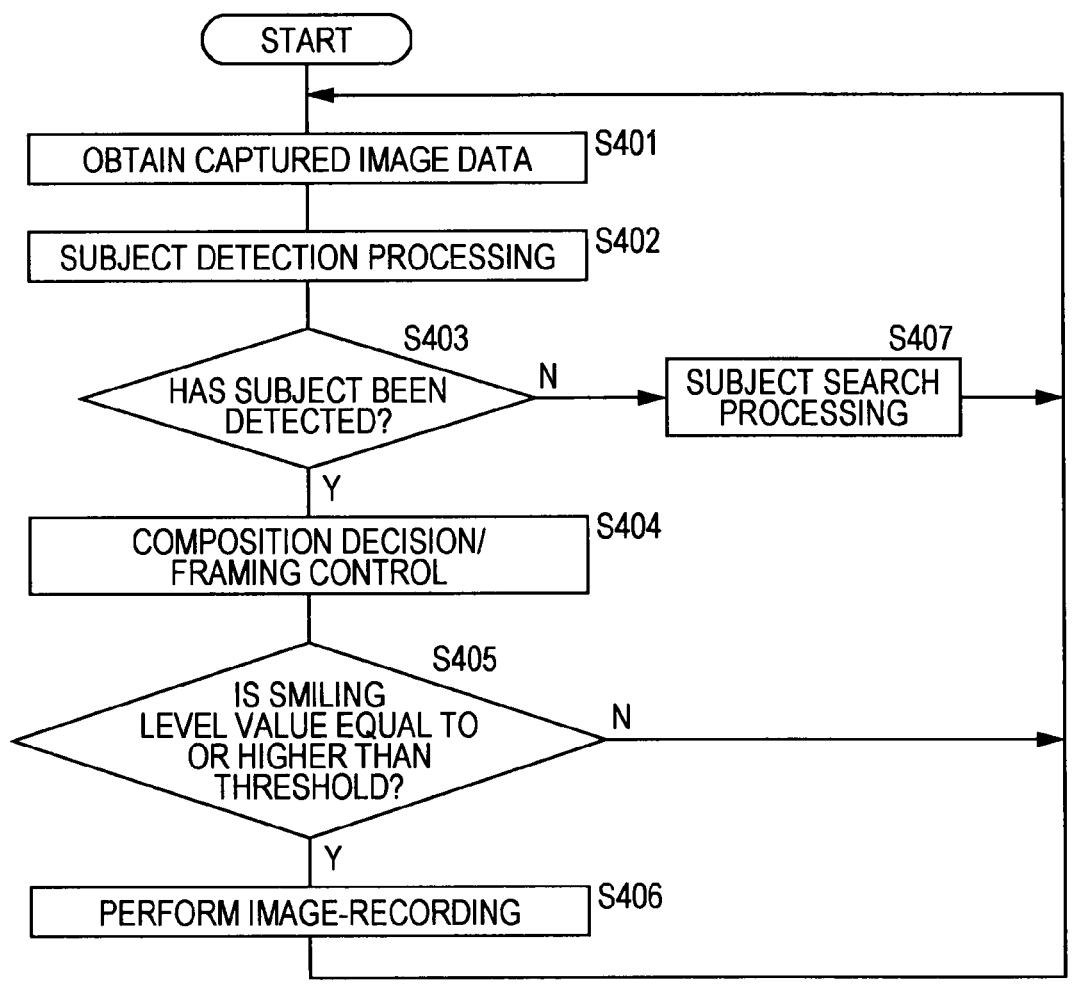
FIG. 13 is a flowchart illustrating, as a second embodiment, an example of an automatic image-recording algorithm using a frequency-associated parameter.

The flowchart of FIG. 13 illustrates an example of the automatic image-recording algorithm according to the second embodiment. The algorithm shown in this diagram is based on that shown in FIG. 9.

As the operation obtained from this algorithm, if a certain degree of smiling (smiling level) of higher is obtained after performing framing control, it is determined that the composition is OK, and then, image-recording is performed. More specifically, the elements of the composition include the degree of smiling, and in the state in which the size, the position, etc. of a subject match those of the decided composition as a result of framing control, a determination is made whether the conditions of the composition in terms of smiling are satisfied. By using such an algorithm, a smiling subject can be image-recorded under a certain optimum composition, and interesting photographs (captured image data) can be collected if the user looks at the photographs later.

In this diagram, steps S401 through S404 and S407 are similar to steps S101 through S104 and S107, respectively, of FIG. 9.

In this diagram, as determination processing corresponding to step S105 of FIG. 9, it is determined in step S405 whether the smiling level value of a detected subject is equal to or higher than a threshold.

In this case, as the subject detection processing, the composition decision block 62 also detects smiling of a detected subject. Additionally, in this smiling detection, the degree of smiling is also detected, and in accordance with this detection result, the smiling level value indicating the degree of smiling is obtained. Here, as the smiling level value becomes higher, the degree of smiling is more noticeable.

It is noted that the algorithm and the method for detecting smiling are not particularly restricted, and, for example, a currently known method may be employed.

Then, if a negative determination result is obtained in step S405 since the smiling level value is not equal to or higher than the threshold even after the lapse of a certain time, the process returns to step S401.

In contrast, if the smiling level value is equal to or higher than a certain level, image-recording is performed in step S406.

According to the automatic image-recording algorithm of the second embodiment, the frequency-associated parameter is the threshold to be compared with the smiling level value in step S405.

In step S203 of FIG. 10, for example, the threshold is set and changed to become lower as the set frequency becomes higher. Even if the degree of smiling is low, if the threshold is low, it is more likely that a positive determination result of step S405 is obtained and that image-recording is performed. As a result, the recording frequency becomes high.

<7. Example of Frequency-Associated Parameter (Third Embodiment)>

The automatic image-recording operation obtained by the algorithm of the third embodiment is, for example, as follows. With the same subject configuration, recording is continuously performed a prescribed number of times, and after performing recording the prescribed number of times, panning/tilting is performed so as to obtain another subject configuration. This operation is repeated.

It is noted that, here, the subject configuration is a combination of individual subjects obtained in an image represented by captured image data.

A specific example will be given. It is now assumed that an image including only subject A has been automatically recorded so far. In other words, an image formed of, as an element of the composition, a subject configuration including only the subject A is automatically image-recorded.

Then, if, for example, subjects B and C are also present in addition to the subject A around the imaging system, a combination of "other subject configurations" other than the subject configuration consisting of only the subject A may be as follows: "only subject B", "only subject C", "combination of subjects A and B", "combination of subjects A and C", "combination of subjects B and C", and "combination of subjects A, B, and C".

Figure 14:
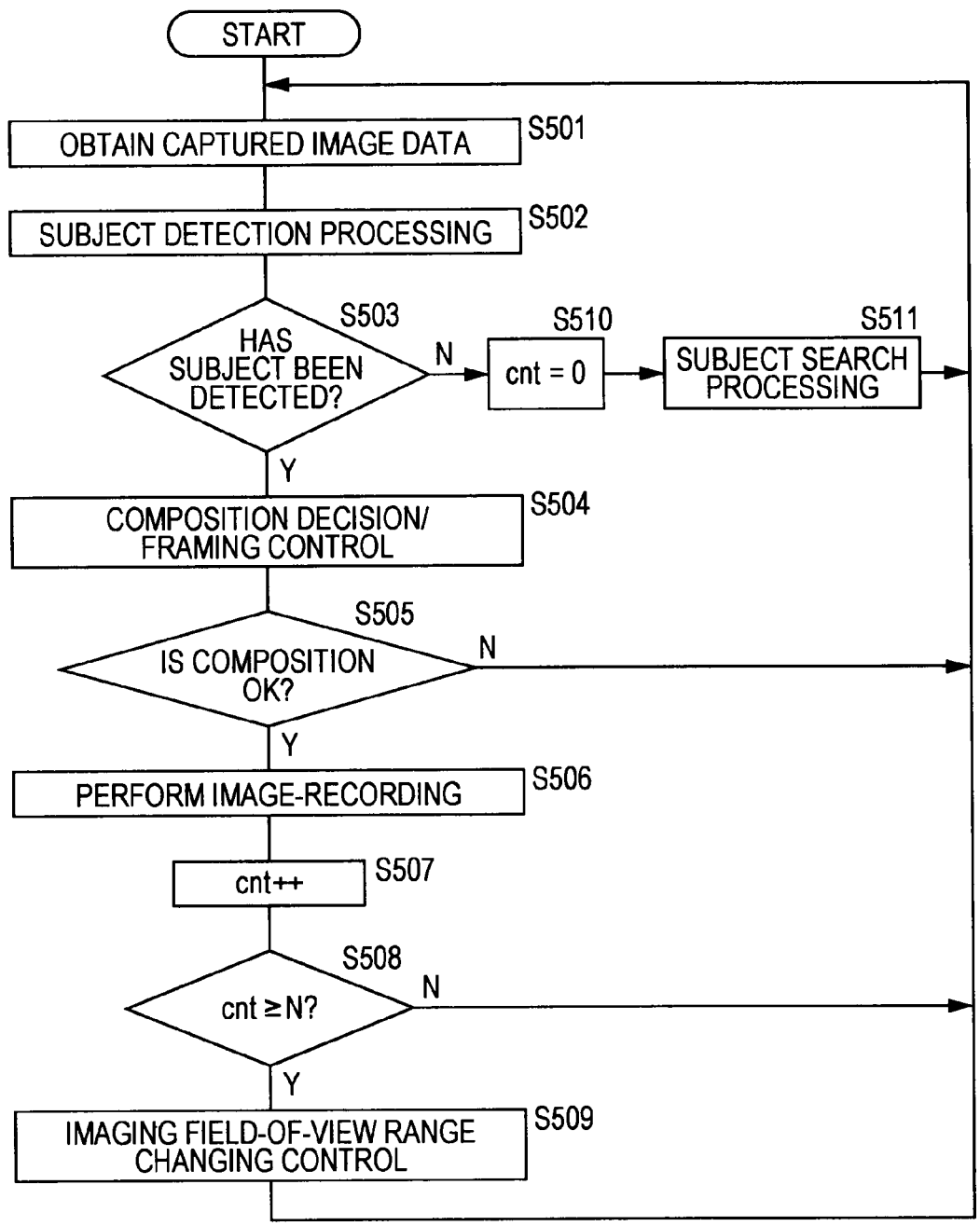
FIG. 14 is a flowchart illustrating, as a third embodiment, an example of an automatic image-recording algorithm using a frequency-associated parameter.

The flowchart of FIG. 14 illustrates an example of the automatic image-recording algorithm according to the third embodiment.

In this diagram, steps S501 through S505 and S511 are similar to steps S101 through S104 and S107, respectively, of FIG. 9.

In FIG. 14, if a negative determination result is obtained in step S503 since no subject has been detected, in step S510, 0 is substituted into the count value cnt, and then, in step S511, subject search processing is started. The process then returns to step S501.

The count value cnt is, as will be understood from the following description, the number by which image-recording is continuously performed with the same subject configuration.

Every time image-recording is performed one time in step S506, processing for incrementing the count cnt is executed in step S507.

Next, the composition decision block 62 determines in step S508 whether the count value cnt is equal to or greater than a prescribed maximum value N. In this case, the prescribed maximum value N is, as the threshold, a value corresponding to the prescribed time for which the same subject configuration is to be continuously image-recorded.

If a negative determination result is obtained in step S508, image-recording is still to be performed with the same subject configuration, and thus, the process returns to step S501. Accordingly, in step S503, the same subject configuration as the previously detected configuration is detected, and in steps S504 through S506, image-recording is executed again with a certain composition.

Then, if a positive determination result is obtained in step S508, image-recording has been performed with the same subject configuration the prescribed number of times. Then, in this case, the process proceeds to step S509 to execute imaging field-of-view range changing control. That is, in order to obtain an image represented by the captured image data with a subject configuration different from that in the previous image-recording, panning is mainly performed, thereby changing the imaging field-of-view range in the horizontal direction. On that basis, in step S511, the count value cnt is initialized to 0, and the process returns to step S501.

As one of the specific examples of this imaging field-of-view range changing control, an algorithm for causing the pan/tilt/zoom control block 63 to perform pan control so that the pan/tilt head 10 moves only by a prescribed angle $\alpha°$ in the pan direction can be considered.

There are several ways to determine the prescribed angle $\alpha°$. Examples of setting of the prescribed angle $\alpha°$ and examples of operations of imaging field-of-view range changing control obtained by the setting of this prescribed angle $\alpha°$ are described with reference to FIG. 15.

Figure 15:
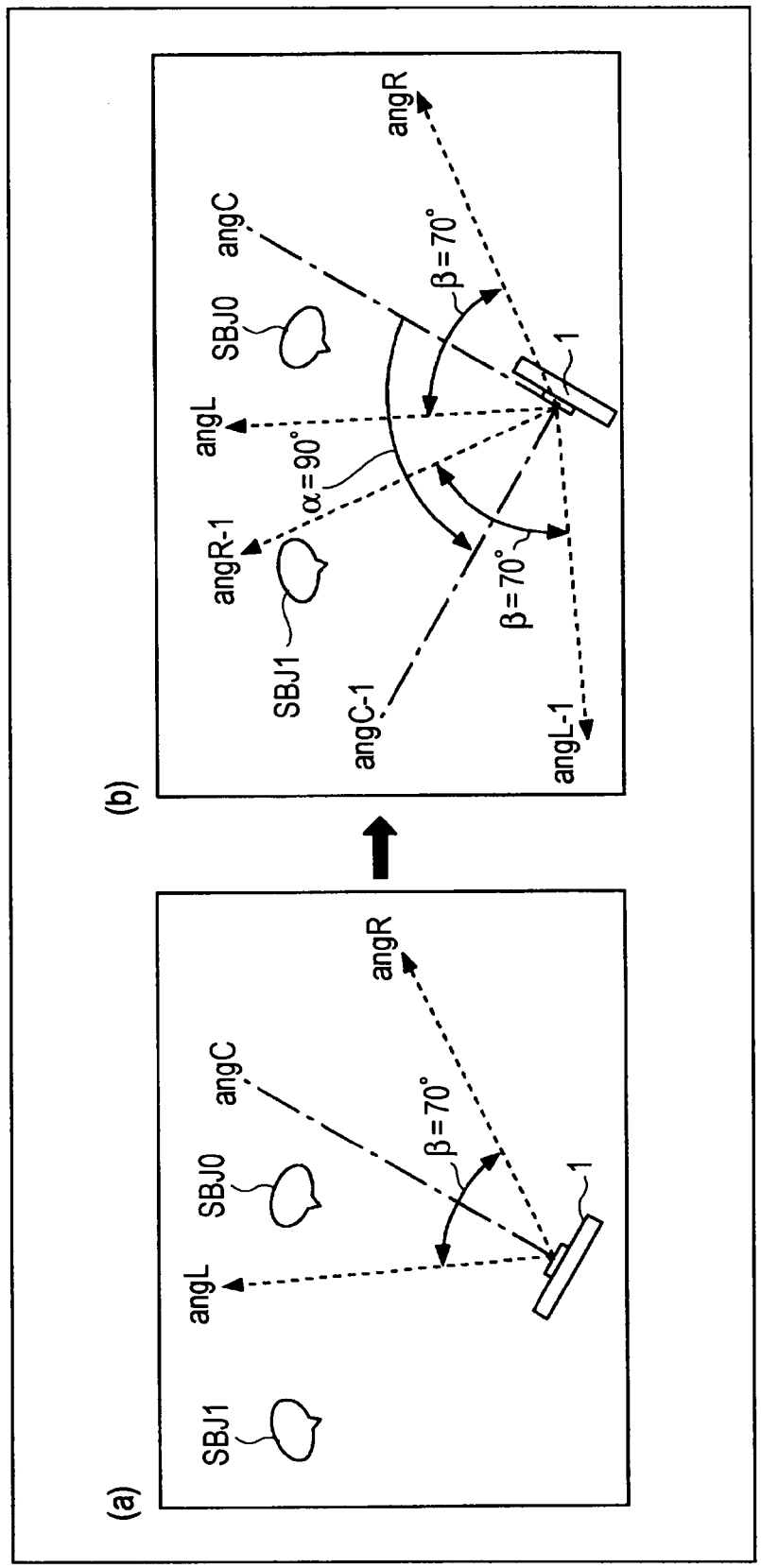
FIG. 15, which includes views, illustrates examples of operations obtained by imaging field-of-view range changing control.

In part (a) of FIG. 15, the digital still camera 1 is observed from the top. It is noted that, although this digital still camera 1 is, in reality, fixed on the pan/tilt head 10, the pan/tilt head 10 is not shown for the sake of simple representation.

Also, the angle of view set for the digital still camera 1 is expressed by the center angle of view angC, the left-end angle of view angL, and the right-end angle of view angR. It is noted that the center angle of view angC coincides with the imaging optical axis of the digital still camera 1 and that the angle from the center angle of view angC to the left-end angle of view angL is the same as the angle from the center angle of view angC to the right-end angle of view angR. The imaging field-of-view range in the horizontal direction corresponds to the range from the left-end angle of view angL to the right-end angle of view angR. For the sake of description, it is now assumed that the imaging field-of-view range in the horizontal direction is set to be the widest angle of view (wide end). Then, here, the angle of view at the wide end is set to be 70°.

Then, it is now assumed that two subjects SBJ0 and SBJ1 are present, as shown in the drawing, around the digital still camera 1 and the pan/tilt head 10. It is also assumed that, for the sake of description, the subjects are not moved and the absolute positions thereof are fixed.

In the state of part (a) of FIG. 15, it is now assumed that, of the subjects SBJ0 and SBJ1, only the subject SBJ0 is contained in the imaging field-of-view range of the digital still camera 1. Then, it is now assumed that, as a result of performing, in the state shown in part (a) of FIG. 13, image-recording of captured image data containing the subject SBJ0 within a frame, for example, a predetermined number of times, according to the algorithm shown in FIG. 14, a positive determination result is obtained in step S508 since the conditions for shifting to another subject configuration are satisfied.

In accordance with the positive determination result in step S508, in step S509, the movement in the pan direction by a prescribed angle $\alpha°$ is performed.

In the example shown in FIG. 15, 90° is set as the absolute value of the prescribed angle $\alpha°$. This is because the angle of view at the wide end of the digital still camera 1 is 70° and an appropriate value greater than this angle of view is set. That is, here, as the prescribed angle $\alpha°$, a value greater than the angle of view of the digital still camera 1 is to be set.

Then, here, in step S308, the pan movement with a prescribed angle $\alpha°=90°$ in the counterclockwise direction is performed, as shown in part (b) of FIG. 15. Accordingly, the imaging field-of-view range (horizontal direction) of the digital still camera 1 is changed to a range from the left-end angle of view angL−1 to the right-end angle of view angR−1 in part (b) of FIG. 15.

In this manner, as a result of performing 90° pan movement in the counterclockwise direction (i.e., pan movement greater than the angle of view at the wide end), there is no overlapping portion of the imaging field-of-view range (from angL−1 to angR−1), which is newly obtained after performing pan movement, and the imaging field-of-view range (from angL to angR) before performing pan movement. Thus, although the subject SBJ0 has been contained within the imaging field-of-view range (from angL to angR) before performing pan movement, it extends to the outside the imaging field-of-view range (from angL−1 to angR−1) after performing pan movement. Instead, the subject SBJ1 is contained in the imaging field-of-view range (from angL−1 to angR−1) after performing pan movement. In this manner, in the case of FIG. 15, the previously detected subject is omitted, and another subject configuration different from that used in the previous image-recording is obtained.

It is noted that, in the imaging field-of-view range changing control (step S509) of FIG. 14, if there is no subject in the imaging field-of-view range after performing pan movement, no subject is detected. In this case, a negative determination result is obtained in step S503, and subject search control is executed in step S311.

Additionally, in the above description, in the imaging field-of-view range changing control in step S509, only pan movement is executed. However, in order to increase the possibility of a new subject being contained in the imaging field-of-view range, pan control for moving the digital still camera 1 at a predetermined pan position which is set as a position suitable for detecting a subject, or zoom control for returning to the wide end may be executed together.

Also, in another example of imaging field-of-view range changing control, as the imaging field-of-view range changing control in step S509, pan movement in the counterclockwise direction or in the clockwise direction is started by using the pan/tilt/zoom control block 63.

When the process returns from step S509 to step S501, the image represented by the captured image data is changed in accordance with a change in the imaging field-of-view range by pan movement. Then, in this state, subject detection processing is executed in step S502.

On that basis, in the determining processing in step S503, if the process returns from step S508 to step S501 and reaches step S503, a determination regarding whether a subject is detected in the image represented by the captured image data is simply made.

In contrast, if the process returns from pan movement start control performed as the imaging field-of-view range changing control in step S509 to step S501 and reaches step S503, conditions for the determination are different from those described above. That is, in step S503 in this case, it is determined whether a new subject different from the subject which has been detected before executing step S509 (corresponding to the previous image-recording) is detected as a result of the above-described subject detection processing. It is noted that, in this determination, the subject which has been detected before executing step S509 may still be detected, or may not be detected since it has extended to the outside the imaging field-of-view range at a certain time.

For example, even if the movement by a predetermined distance has been completed after starting pan movement by the imaging field-of-view range changing control in step S509, a negative determination result is obtained in step S503 if a new subject has not been detected. In this case, subject detection processing in step S409 is started, and the process returns to step S501.

In contrast, if a positive determination result is obtained since a new subject has been detected, the process proceeds to step S504 and the subsequent steps.

Figure 16:
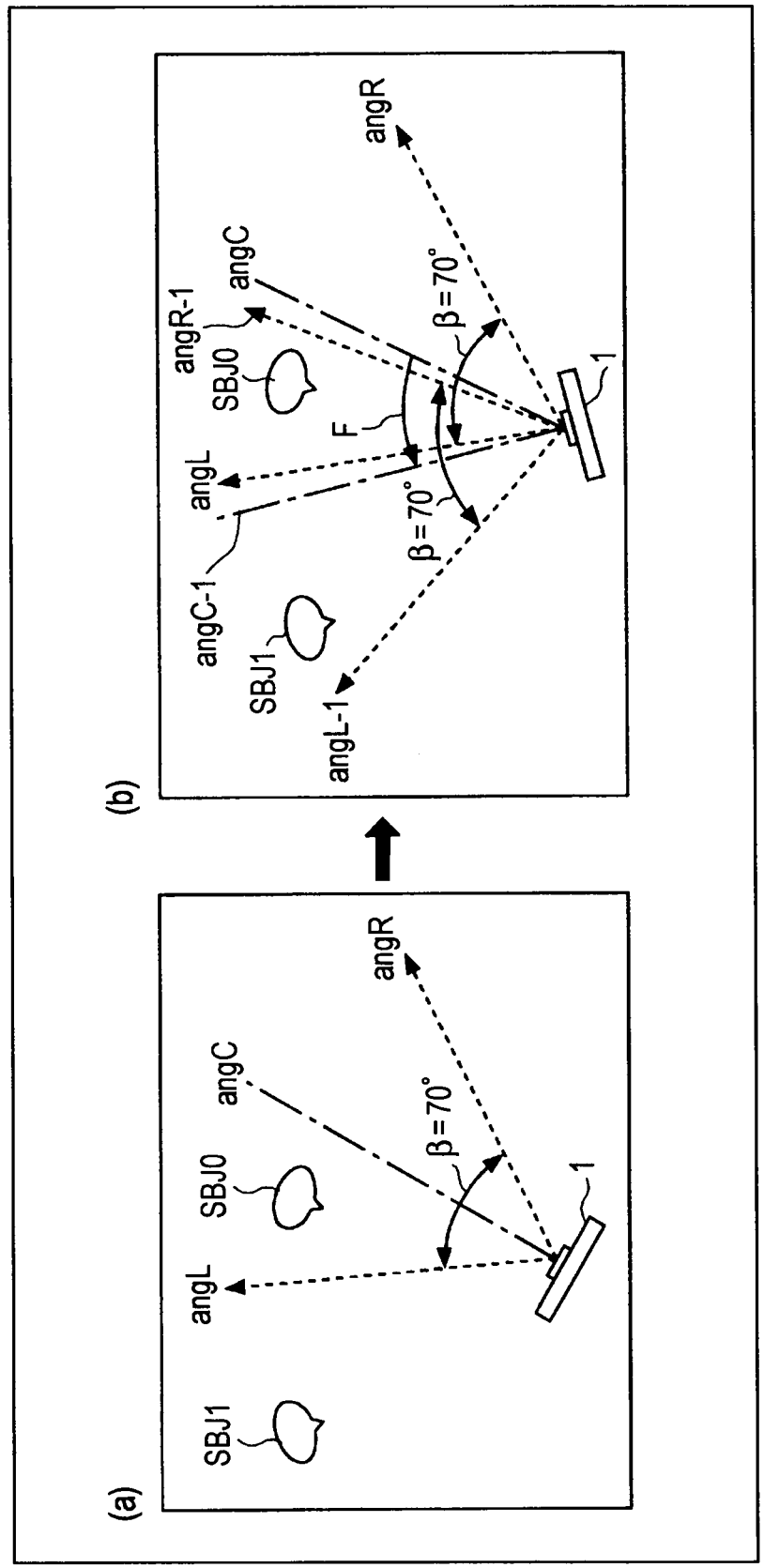
FIG. 16, which includes views, illustrates examples of operations obtained by another imaging field-of-view range changing control.

A specific example of the operation according to this imaging field-of-view range is shown in FIG. 16. The same state as that shown in part (a) of FIG. 15 is shown in part (a) of FIG. 16. In this case, too, it is now assumed that, in the state shown in part (a) of FIG. 16, as a result of performing image-recording by using a composition containing the subject SBJ0 a predetermined number of times, a positive determination result is obtained in step S407.

Accordingly, pan movement is started as the imaging field-of-view range changing control in the above-described step S509. It is now assumed that, here, pan movement in the counterclockwise direction is performed from the position shown in part (a) of FIG. 16.

Then, as shown in part (b) of FIG. 16, when pan movement is performed by a movement angle F from the position shown in part (a) of FIG. 16, the state in which the subject SBJ1 is contained in the imaging field-of-view range from the left-end angle of view angL−1 to the right-end angle of view angR−1 is obtained. In accordance with this state, a positive determination result is obtained in step S503, and the process proceeds to processing of step S504 and the subsequent steps.

Here, in the imaging field-of-view range from the left-end angle of view angL−1 to the right-end angle of view angR−1 after performing pan movement shown in part (b) of FIG. 16, not only the subject SBJ1, but also the subject SBJ0, which has been contained in the imaging field-of-view range from the left-end angle of view angL to the right-end angle of view angR before performing pan movement, is contained. In this manner, even if the subject SBJ0, which has been contained before performing pan movement, is present in the image, the subject configuration is expressed by a combination of the subject SBJ0 and the new subject SBJ1, and thus, it is different from that before performing pan movement (imaging field-of-view range changing control) in step S508. Then, if a positive determination result is obtained in step S503 in the state in part (b) of FIG. 16, a determination result corresponding to a composition formed of two subjects is obtained in the composition determination in step S504.

In this manner, in the third embodiment, when the captured image data represented by an image with the same subject configuration is recorded the number of times corresponding to the prescribed maximum value N, another subject configuration is searched for. That is, care is taken not to record an image with the same subject configuration more than necessary.

On that basis, the frequency-associated parameter in the third embodiment is the prescribed maximum value N.

In step S203 of FIG. 10 corresponding to the third embodiment, the prescribed maximum value N is set to become greater as the set recording frequency becomes higher.

For example, when the recording frequency is set to be high, and if the value as the prescribed maximum value N is relatively small, the following problem occurs. The number of photos to be image-recorded with one subject configuration is small, and as a result, the frequency is not increased. Then, if the prescribed maximum value N is set to become greater as the set recording frequency becomes higher, the frequency of the actual automatic image-recording is also increased.

<8. Example of Frequency-Associated Parameter (Fourth Embodiment)>

In the above-described algorithm shown in FIG. 14, in step S504, basically, the algorithm for deciding a certain predetermined composition is employed. In this case, however, basically, all of captured image data elements to be recorded for the prescribed maximum number N in association with one subject configuration have the same composition.

An optimum composition that can be considered in association with one subject configuration is not necessarily only one, and, in reality, several variations can be considered. Then, if a different composition is obtained every time image-recording is executed toward the prescribed maximum value N according to the algorithm shown in FIG. 14, the content of photos obtained in association with one subject configuration is varied, which is more preferable.

In the fourth embodiment, therefore, as described above, a configuration for enabling a different composition to be obtained every time image-recording is performed toward the prescribed maximum value N is first obtained.

FIG. 17 illustrates an example of steps according to the fourth embodiment for obtaining a different composition every time image-recording is performed toward the prescribed maximum value N.

This processing is, for example, processing for selecting the composition decision algorithm when performing composition decision processing in step S504 of FIG. 14.

First, it is now assumed that the composition decision block 62 stores therein different composition decision algorithms in accordance with the number corresponding to the range of the prescribed maximum number N that can be changed and set.

On that basis, in FIG. 17, in step S601, the composition decision block 62 first calls the current count value cnt. Then, in step S602, the composition decision block 62 substitutes the value set for this called count value cnt into variable m.

The variable m corresponds to the identification number of the composition decision algorithm stored in the composition decision block 62. In step S603, the composition decision block 62 calls the composition decision algorithm $m(1<m<N)$ among the composition decision algorithms 1 through N. Then, in step S604, the composition decision block 62 executes the program as the composition decision algorithm m so as to execute the composition decision processing for the currently detected subject.

With this processing, the composition decision algorithm is changed in accordance with the count value cnt. That is, a different composition is obtained every time image-recording is executed with one subject configuration.

In a case where the composition decision algorithm is formed in this manner, the number of elements forming the composition to be decided according to the composition decision algorithm may be changed in accordance with the set frequency. That is, in the fourth embodiment, the frequency-associated parameter is the number of elements forming the composition to be decided according to the composition decision algorithm.

One specific example is shown in FIG. 18.

FIG. 18 illustrates a case where the set frequencies are classified into three levels "LOW", "INTERMEDIATE", and "HIGH".

Here, when the set frequency is "LOW", three elements, i.e., the subject position, the subject size, and the face direction, are employed as the composition forming elements. Then, when, for example, automatic image-recording is performed by applying FIG. 17 to FIG. 14, each of the subject position, the subject size, and the face direction is changed every time image-recording is performed with one subject configuration. In this case, if, as the decided composition, a composition having the subject position, the subject size, and the face direction which have been changed is obtained in the image, it is determined in step S505 that the composition is OK, and image-recording is not performed.

Also, when the set frequency is "INTERMEDIATE", the facing direction is eliminated from the composition forming elements, and two elements, i.e., the subject position and the subject size, are employed. Every time image-recording is performed with one subject configuration, the subject position and the subject size are changed. In this case, if the subject position and the subject size are the same as those of the decided composition, image-recording is performed. That is, it is more likely that image-recording is performed than the case of the set frequency "LOW", and the actual recording frequency is also increased.

Further, when the set frequency is "HIGH", the face direction and the subject size are eliminated from the composition forming elements, and one element, i.e., the subject position, is employed. Then, only the subject position is changed every time image-recording is performed with one subject configuration. In this case, if only the subject position is the same as that of the decided composition, image-recording is performed. That is, it is even more likely that image-recording is performed than the case of the set frequency "INTERMEDIATE", and the actual recording frequency is further increased.

<9. Example of Frequency-Associated Parameter (Fifth Embodiment)>

Figure 19:
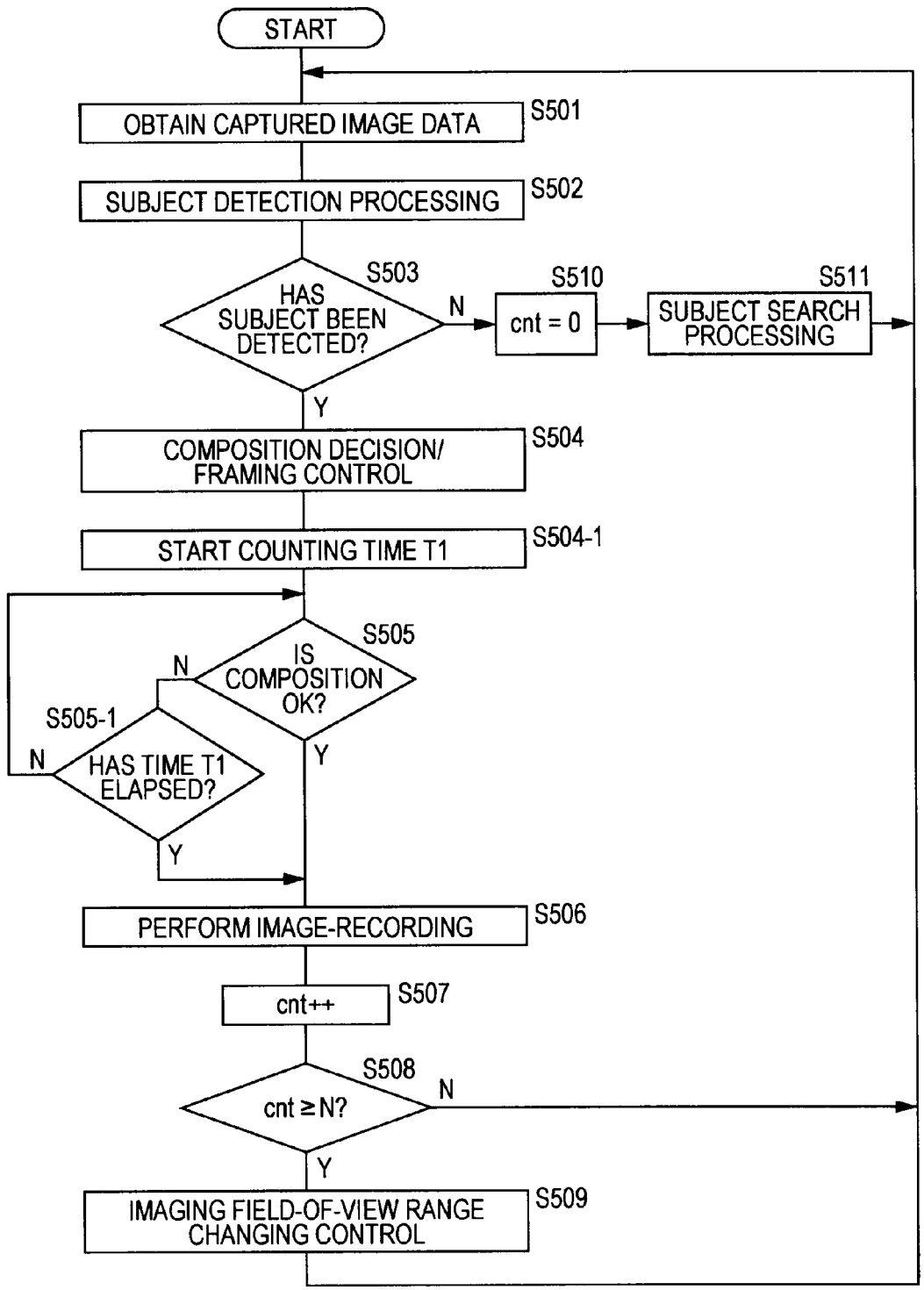
FIG. 19 is a flowchart illustrating, as a fifth embodiment, an example of an automatic image-recording algorithm using a frequency-associated parameter.

The flowchart of FIG. 19 illustrates an example of the automatic image-recording algorithm according to the fifth embodiment.

The automatic image-recording operation shown in this diagram is based on the algorithm obtained by applying FIG. 17 to FIG. 14, and image-recording is forcefully performed if a constant time has elapsed even if the decided composition is not obtained. If the decided composition has not been obtained for a constant time or longer, in the foregoing embodiments, the flow returns to subject detection without performing image-recording. On the other hand, the idea that even if the decided composition has not been obtained for a constant time or longer, a detected subject may be image-recorded may be employed. The fifth embodiment concerns the automatic image-recording operation based on such an idea.

In FIG. 19, steps S501 through S504, S505, and S506 through S511 are similar to those of FIG. 14.

In FIG. 19, after performing framing control in step S504, the counting of time T1 is started in step S504-1, and it is determined in step S505 whether the decided composition has been obtained.

Then, if a negative determination is obtained in step S505 since the decided composition has not been obtained, the process returns to step S505 unless it is determined in step S501-1 that the time T1 has elapsed. That is, the process waits for the decided composition to be obtained by using the time T1 as the maximum wait time.

If it is determined in step S505 that the composition is OK before the time T1 has elapsed in step S505-1, the process proceeds to step S506 to perform image-recording. In this case, the captured image data having the decided composition can be recorded.

Also, in this case, if it is determined in step S505-1 that the time T1 has elapsed before the decided composition has not been obtained, the process also proceeds to step S506.

In this case, captured image data representing the image content including a detected subject is recorded even if the decided composition has not been obtained.

Then, in this case, the time T1 is treated as the frequency-associated parameter. In step S203 of FIG. 10 according to the fifth embodiment, the time T1 is set to become shorter as the set recording frequency becomes higher. As the time T1 becomes shorter, the wait time until image-recording is performed even if the decided composition is not obtained is shortened. As a result, the recording frequency is increased.

It is noted that, in the algorithm shown in FIG. 19, in addition to this algorithm, at least one of the algorithm using the prescribed maximum value N as the frequency-associated parameter in the third embodiment and the algorithm using the number of composition forming elements as the frequency-associated parameter in the fourth embodiment may be used. The same applies to the following sixth embodiment.

<10. Example of Frequency-Associated Parameter (Sixth Embodiment)>

Figure 20:
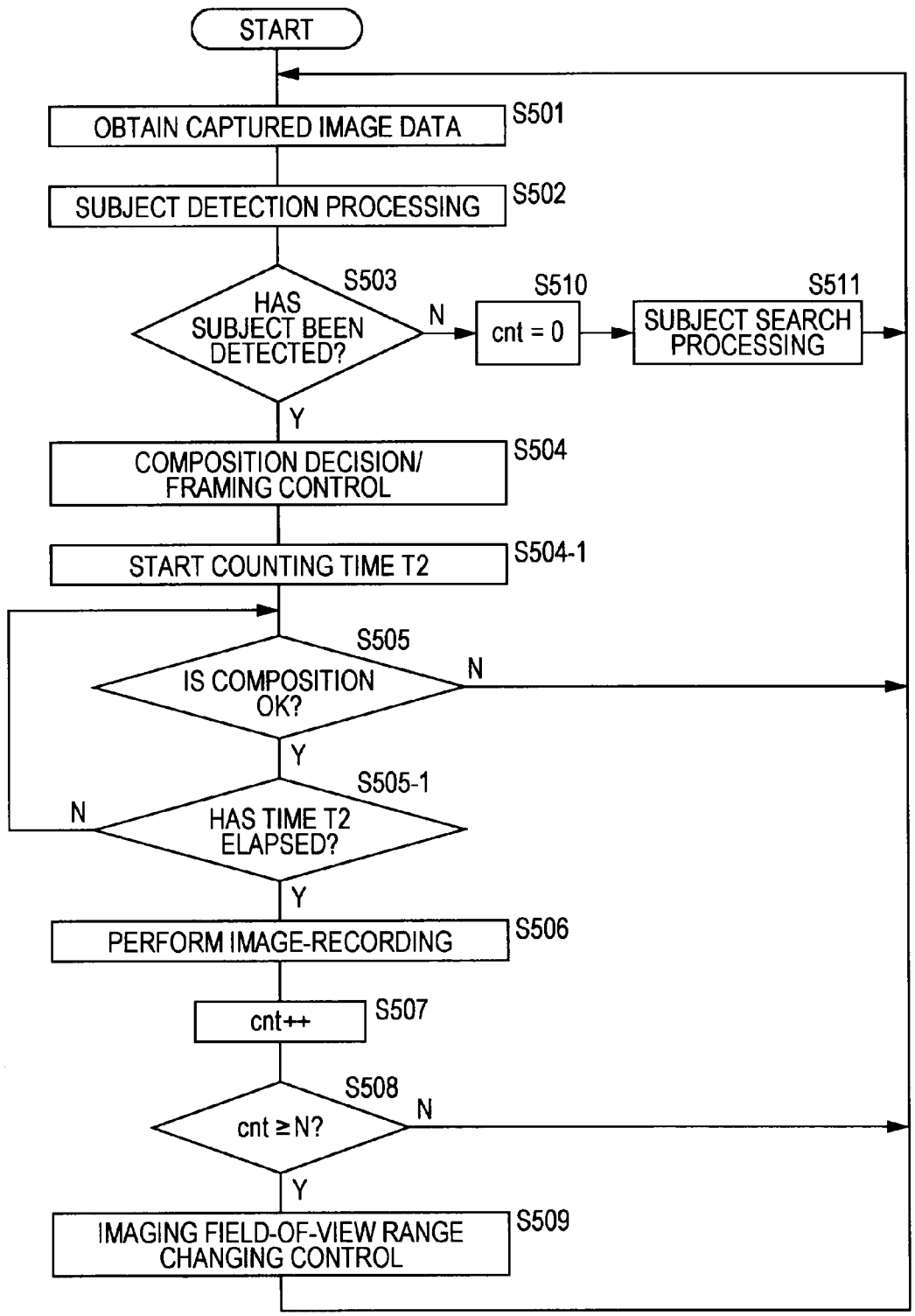
FIG. 20 is a flowchart illustrating, as a sixth embodiment, an example of an automatic image-recording algorithm using a frequency-associated parameter.

The flowchart of FIG. 20 illustrates an example of the automatic image-recording algorithm as the sixth embodiment.

In the automatic image-recording operation according to this algorithm, even if it is determined that the composition is OK, image-recording is not forcefully performed during a constant time T2. On that basis, the time T2 is treated as the frequency-associated parameter.

FIG. 20 is also based on the algorithm shown in FIG. 14. In this diagram, steps S501 through S505, and S506 through S511 are the same as those of FIG. 14.

In FIG. 20, after performing framing control in step S504, the counting of time T2 is started in step S504-1, and it is determined in step S505 whether the decided composition has been obtained.

Then, if a positive determination is obtained in step S505 since it is determined that the composition is OK, a determination is made in step S505-1 regarding whether the time T2 has elapsed. If a negative determination result is obtained, the process returns to step S505. If a positive determination result is obtained, image-recording is performed in step S506.

Note that, in this case, a case where a negative determination result is obtained in step S505 is a case where it is not determined that the composition is OK even after the lapse of the time T2.

That is, as described above, in the sixth embodiment, even in the state in which the decided composition is obtained after framing, image-recording is not performed unless the time T2 has elapsed.

On that basis, as described above, in the sixth embodiment, this time T2 is treated as the frequency-associated parameter. In step S203 of FIG. 10 according to this embodiment, the time T2 is set to become shorter as the set recording frequency becomes higher. Accordingly, the time from when the decided composition has been obtained as a result of framing until when image-recording is performed is shortened. As a result, captured image data to be recorded in a certain time unit length is increased. That is, the actual recording frequency is increased.

<11. Example of Frequency-Associated Parameter (Seventh Embodiment)>

Figure 21:
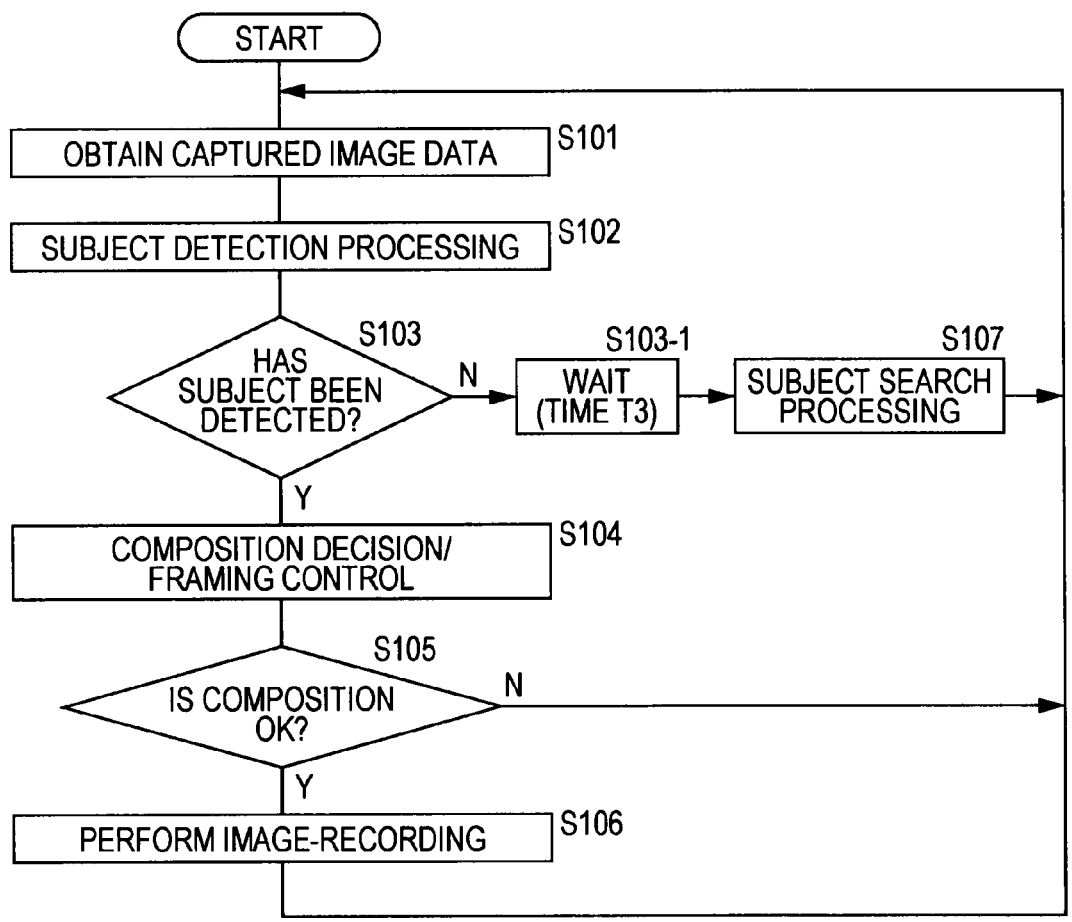
FIG. 21 is a flowchart illustrating, as a seventh embodiment, an example of an automatic image-recording algorithm using a frequency-associated parameter.

The flowchart of FIG. 21 illustrates an example of the automatic image-recording algorithm as the seventh embodiment. It is noted that FIG. 21 is based on the algorithm expressed by the flowchart shown in FIG. 9. In FIG. 21, steps S101 through S107 (except for S103-1) are similar to those of FIG. 9.

In FIG. 21, if a negative determination result is obtained in step S103 since no subject has been detected, in step S203-1, the process waits for wait time T3, and then, subject search processing is started in step S207.

That is, in the seventh embodiment, when starting subject search processing, the wait time T3 is given before subject search processing is started. Then, this wait time T3 is treated as the frequency-associated parameter.

In step S203 of FIG. 10 according to the seventh embodiment, the wait time T3 is set to become shorter as the set recording frequency becomes higher.

As the wait time T3 becomes shorter, the time before subject search is started becomes shorter. As a result, the number of captured image data elements to be recorded in the unit time length is increased, and the actual frequency is also increased.

<12. Automatic Frequency Changing/Setting Processing (First Example)>

So far, the recording frequency has been set by a user operation.

However, there may be some cases where the recording frequency be also changed by conditions other than a user operation, that is, conditions other than a user's intention.

For example, captured image data is recorded on the memory card 40 of the digital still camera 1. As a matter of course, as the number of captured image data elements to be subjected to continuous image-recording increases, the space of this memory card 40 decreases. Then, if captured image data is recorded with the same frequency as before even though the space of the memory card 40 decreases, the space of the memory card 40 will become 0 in a short period of time.

Considering this, the recording frequency may be changed and set in accordance with the space of the memory card 40.

Figure 22:
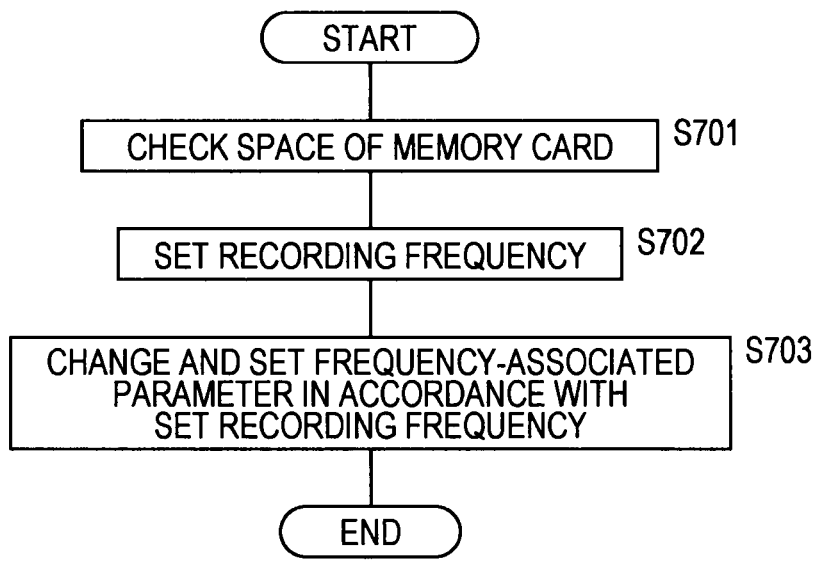
FIG. 22 is a flowchart illustrating an example of changing and setting of the recording frequency and the frequency-associated parameter in accordance with the space of a memory card.

FIG. 22 illustrates, as processing executed by the composition decision block 62, processing for changing and setting the recording frequency and the frequency-associated parameter in accordance with the space of the memory card 40. In step S701, the composition decision block 62 checks the space of the memory card 40. Then, in step S702, the recording frequency is suitably set in accordance with the space of this memory card 40. In this case, the recording frequency is set to decrease as the space of the memory card 40 decreases.

Then, in step S703, as in step S203 of FIG. 10, the frequency-associated parameter is changed and set in accordance with the set recording frequency.

<13. Automatic Frequency Changing/Setting Processing (Second Example)>

Additionally, in the imaging system of the present embodiment, both the digital still camera 1 and the pan/tilt head 10 are configured to be driven by a battery. Also, for example, if an AC adapter is connected to the pan/tilt head 10, power of the AC adapter is supplied, not only to the pan/tilt head 10, but also to the digital still camera 1, so that both of the digital still camera 1 and the pan/tilt head 10 are AC (commercial alternating-current power source)-driven.

In this case, in the case of battery driving, it is necessary that, for example, power consumption be suppressed so as to obtain the longest possible operating time. Here, if the recording frequency is relatively high, the number of recording operations and the pan/tilt driving time in the unit time increase, thereby increasing the power consumption and decreasing the operating time.

From this point of view, it is preferable that the recording frequency be set to be low when battery driving is employed.

In contrast, in the case of AC driving, it is not necessary to consider the battery driving time, and thus, the necessity of suppressing the power consumption is eliminated. Accordingly, in the case of AC driving, the recording frequency can be set to be high.

Thus, the following configuration may be considered. In accordance with the power driving state of the imaging system, i.e., AC driving or battery driving, the recording frequency may be changed and set.

Figure 23:
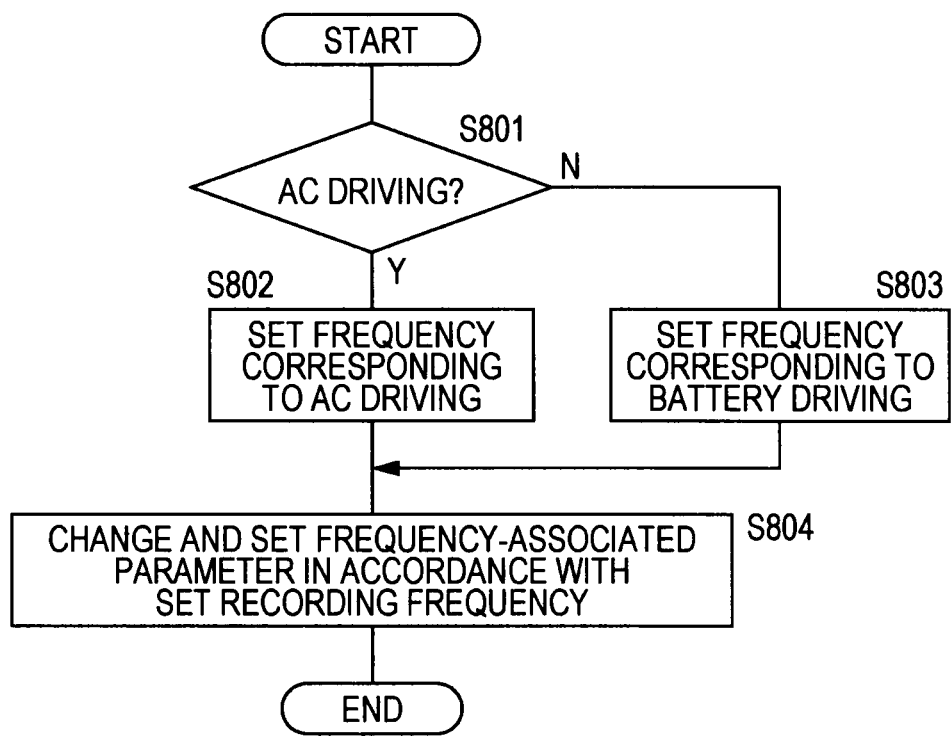
FIG. 23 is a flowchart illustrating an example of changing and setting of the recording frequency and the frequency-associated parameter in accordance with power driving.

FIG. 23 illustrates, as processing executed by the composition decision block 62, processing for changing and setting the recording frequency and the frequency-associated parameter in accordance with the power driving state between AC driving and battery driving.

In step S801, the composition decision block 62 determines whether the imaging system is currently in the AC driving state. Here, if a positive determination result is obtained, in step S802, the recording frequency, which has been prescribed in accordance with AC driving, is set.

In contrast, if a negative determination result is obtained in step S801, it means that the imaging system is in the battery driving state. In this case, in step S803, the recording frequency, which has been prescribed in accordance with battery driving, is set. It is noted that, to deal with battery driving, the remaining amount of battery may also be detected, and the recording frequency may be changed and set in accordance with the remaining amount of battery. For example, as the remaining amount of battery is smaller, the recording frequency is set to be lower.

Then, in step S804, in accordance with the recording frequency set in step S802 or step S803, the frequency-associated parameter is changed and set.

<14. Modified Examples of Imaging System of Present Embodiment>

Figure 24:
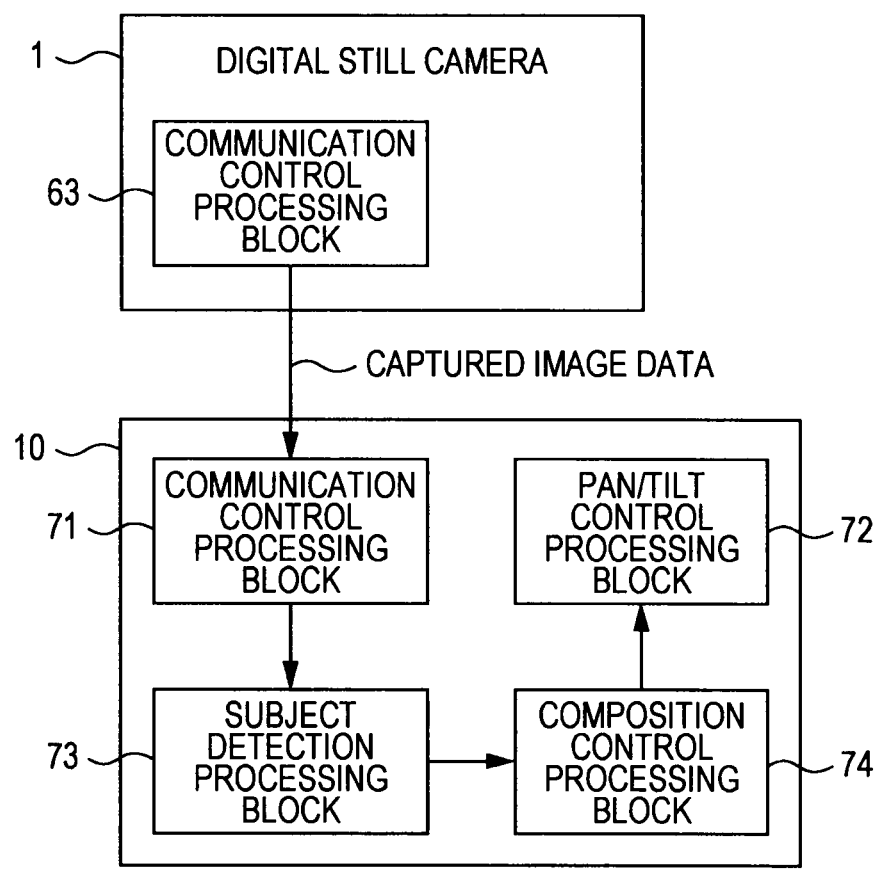
FIG. 24 is a view illustrating an example of the configuration as a modified example made to the imaging system of the embodiment.

FIG. 24 illustrates an example of the configuration, as a modified example made to the imaging system of the present embodiment shown in FIGS. 7 and 8.

In this diagram, first, captured image data generated in the signal processing unit 24 based on imaging is sent from the digital still camera 1 to the pan/tilt head 10 via the communication control processing block 63.

In this diagram, as the configuration of the pan/tilt head 10, the communication control processing block 71, the pan/tilt control processing block 72, a subject detection processing block 73, and a composition control processing block 74 are shown.

The communication control processing block 71 is a functional section corresponding to the communication unit 52 shown in FIG. 7, and is a section that is configured to perform communication processing with the communication control processing block 63 (pan/tilt-head-compatible communication unit 34) of the digital still camera 1 in accordance with predetermined protocols.

The captured image data received by the communication control processing block 71 is delivered to the subject detection processing block 73. This subject detection block 73 is configured to include a signal processing unit that is able to perform at least subject detection processing comparable to the composition decision block 62 shown in FIG. 8, and performs subject detection processing on the input captured image data so as to output the detection information to the composition control processing block 74.

The composition control processing block 74 is able to perform composition control which is comparable to the composition control processing block 62 shown in FIG. 8. When performing pan control and tilt control as a result of this composition control processing, the composition control processing block 74 outputs a control signal for pan control and tilt control to the pan/tilt control processing block 72.

Among the control processing operations executed by the control unit 51 shown in FIG. 7, the pan/tilt control processing block 72 serves as an execution function of performing processing concerning pan/tilt control, and outputs a signal for controlling the movements of the pan mechanism unit 53 and the tilt mechanism unit 56 in accordance with the input control signal to the pan drive unit 55 and the tilt drive unit 58, respectively. With this operation, panning and tilting is performed so that the composition decided by the composition control processing block 62 can be obtained.

In this manner, the imaging system shown in FIG. 24 is configured to send captured image data from the digital still camera 1 to the pan/tilt head 10 so as to perform subject detection processing and composition control in the pan/tilt head 10 on the basis of the input captured image data.

If the zoom control is adapted to be performed, for example, the composition control block 74 is configured to instruct the digital still camera 1 to perform zoom control via the communication control processing block 71.

Figure 25:
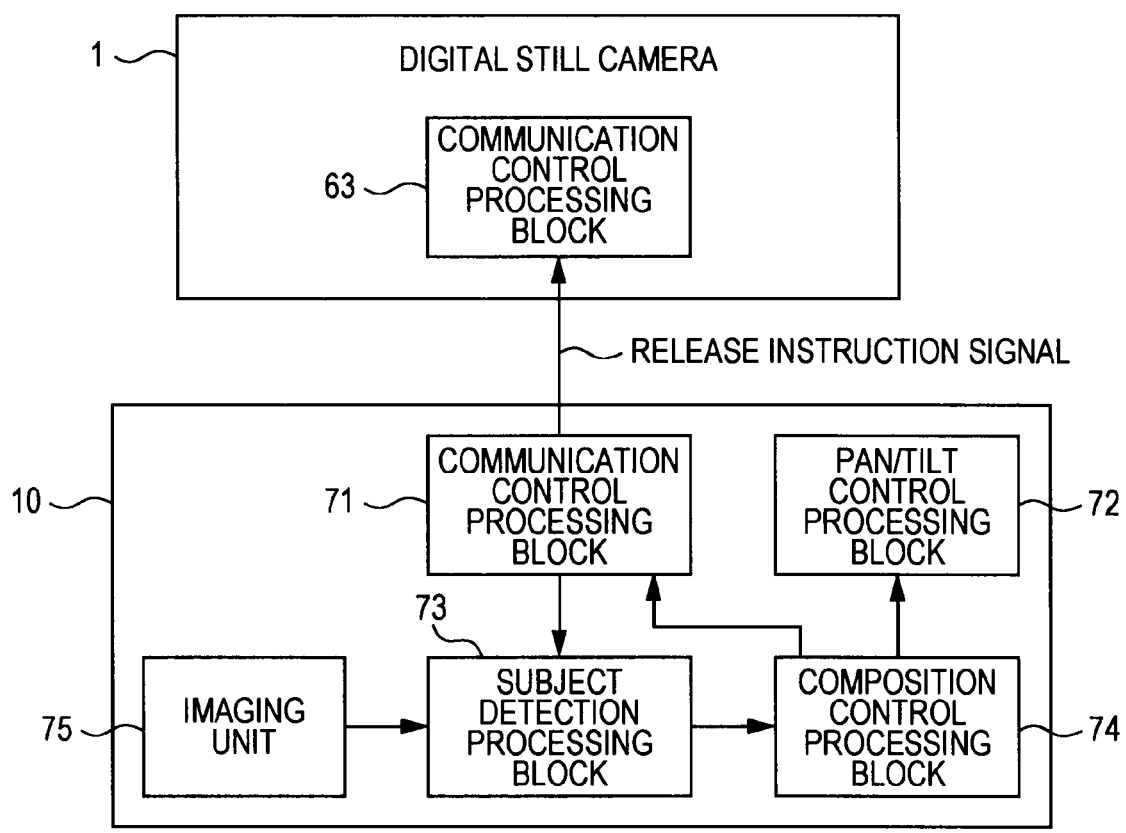
FIG. 25 is a view illustrating an example of the configuration as another modified example made to the imaging system of the embodiment.

FIG. 25 illustrates an example of the configuration, as another modified example made to the imaging system of the present embodiment. In this diagram, the same elements as shown in FIG. 24 are designated by like reference numerals, and an explanation thereof is thus omitted.

In this system, an imaging unit 75 is provided for the pan/tilt head 10. This imaging unit 75 includes, for example, an imaging optical system and an imaging device (imager) and obtains a signal (imaging signal) based on imaging light. The imaging unit 75 also includes a signal processing unit for generating captured image data from this imaging signal. This configuration corresponds to, for example, a section including a signal processing step of obtaining captured image data in the optical system unit 21, the image sensor 22, the A/D converter 23, and the signal processing unit 24 shown in FIG. 6. The captured image data generated in the imaging unit 75 is output to the subject detection processing block 73. It is noted that the direction in which imaging light is input into the imaging unit 75 (imaging direction) is set to be as close as possible to the imaging direction of the optical system unit 21 (lens unit 3) of the digital still camera 1 placed on the pan/tilt head 10.

In this case, the subject detection processing block 73 and the composition control processing block 74 perform subject detection processing and composition control processing, respectively, as in FIG. 24. In this case, however, in addition to pan/tilt control, the composition control processing block 74 causes the communication control processing block 71 to send a release instruction signal to the digital still camera 1 in accordance with a time at which a release operation is to be performed. Upon receiving the release instruction signal, the digital still camera 1 performs a release operation.

In this manner, in this modified example, concerning subject detection processing and composition control, all the control/processing operations, except for the release operation itself, can be completed in the pan/tilt head 10.

Pan control and tilt control executed in composition control as the present embodiment described above are performed by controlling the movements of the pan/tilt mechanisms of the pan/tilt head 10. However, instead of the pan/tilt head 10, for example, the following configuration may be employed. Imaging light reflected by a reflector is incident on the lens unit 3 of the digital still camera 1. On that basis, the reflected light is moved so that a panning and tilting result is obtained in an image obtained on the basis of the imaging light.

Alternatively, control may be performed so that a pixel region for receiving an imaging signal which is effective as an image from the image sensor 22 of the digital still camera 1 is shifted in the horizontal direction and in the vertical direction, thereby obtaining a result comparable to panning/tilting. In this case, it is not necessary to provide the pan/tilt head 10, or a panning/tilting device, which is equivalent to the pan/tilt head 10, other than the digital still camera 1, and by simply using the digital still camera 1, composition control as the present embodiment can be completed.

Alternatively, a mechanism for changing the optical axis of a lens in the optical system unit 21 in the horizontal and vertical directions may be provided, and by controlling the movement of this mechanism, panning/tilting can be performed.

Also, in the foregoing embodiments, the imaging system of the present embodiment is formed of the digital still camera 1 and the pan/tilt head 10, which are separate devices. However, for example, the imaging system may be configured as an imaging apparatus formed by integrating an imaging unit corresponding to the digital still camera 1 and a movable mechanism unit corresponding to the pan/tilt head 10.

Also, in the foregoing embodiments, it is assumed that the subjects (individual subjects) are persons, however, the invention of the present application may be applied to a case where animals other than persons are subjects.

Also, image data, which is an object of subject detection, is not restricted only to data obtained by imaging (captured image data). For example, image data representing the image content, such as paintings or design pictures, may be considered.

Also, the composition (optimum composition) decided in accordance with the invention of the present application is not necessarily restricted to a composition decided by adding an element, i.e., the number of detected individual subjects, to a composition setting technique, such as the rule of thirds. For example, even for a composition, which is generally considered to be not good, the user may find it interesting or even good depending on the setting of the composition. Accordingly, the composition (optimum composition) decided in accordance with the invention of the present application may be set as desired in consideration of practicability or entertainment characteristics. In reality, the decided composition is not particularly restricted.

Also, as described above, at least part of the configuration in accordance with the invention of the present application may be implemented by causing a CPU or a DSP to execute a program.

Such a program may be written and stored in, for example, a ROM, at the time of manufacturing, or may be stored in a removable storage medium and then be installed (including updating) from this storage medium into a DSP-support nonvolatile storage area or the flash memory 30. Alternatively, the program may be installed via a data interface, such as a USB or IEEE1394, under the control of another device, which serves as a host. Further, the program may be stored in a storage device of, for example, a server on the network. Then, a network function may be provided for the digital still camera 1 so that the digital still camera 1 is configured to download and obtain the program from the server.

Reference Signs List 1 digital still camera, 2 shutter button, 3 lens unit, 10 pan/tilt head, 21 optical system, 22 image sensor, 23 A/D converter, 24 signal processing unit, 25 encoding/decoding unit, 26 media controller, 27 control unit, 28 ROM, 29 RAM, 30 flash memory, 31 operation unit, 32 display driver, 33 display unit, 34 pan/tilt-head-compatible communication unit, 40 memory card, 51 control unit, 52 communication unit, 53 pan mechanism unit, 54 pan motor, 55 pan drive unit, 56 tilt mechanism unit, 57 tilt motor, 58 tilt drive unit, 61 image-recording block, 62 composition decision block, 63 pan/tilt/zoom control block, 64 communication control processing block, SBJ (SBJ0-*n*) subject, 71 communication control processing block, 72 pan/tilt control processing block, 73 subject detection processing block, composition control processing block, 75 imaging unit

The invention claimed is:

1. A control apparatus comprising:
   circuitry configured to:
   perform control so that automatic image-recording for automatically recording, on recording means, image data which has been obtained based on imaging by using an imaging unit, is continuously and repeatedly performed;
   change and set a recording frequency, which is a frequency of the automatic image-recording performed by the image-recording control means;
   change and set one or more parameters related to the automatic image-recording based on the set recording frequency;
   detect a subject which is present in an image based on the image data;
   decide a composition in accordance with the detected subject;
   make a determination regarding whether or not the decided composition has continuously been obtained in the image based on the image data for a prescribed time,
   perform the automatic image-recording as a result of a determination that the decided composition has continuously been obtained for the prescribed time; and
   change, as a parameter, the prescribed time to be used for the determination.

2. The control apparatus according to claim 1, wherein the circuitry is further configured to:
   detect a level value of smiling for each detected subject;
   decide a composition in accordance with a detected subject, elements of the composition to be decided including an element in which the detected level value of smiling is equal to or higher than a threshold;
   determine whether or not the detected level value of smiling is equal to or higher than the threshold;
   perform the automatic image-recording as a result of determining that the detected level value of smiling is equal to or higher than the threshold, and
   change, as a parameter, the threshold to be used for the smiling level determination.

3. The control apparatus according to claim 2, wherein the circuitry is further configured to:
   repeatedly record, a prescribed number of times, image data representing an image including a subject configuration which is obtained when a subject has been detected; and
   change, as a parameter, a value of the prescribed number of times.

4. The control apparatus according to claim 3, the circuitry is further configured to:
   control driving of a movable mechanism unit that changes an imaging field-of-view range of the imaging unit so that, as a result of recording, the prescribed number of times, the image data representing the image including the subject configuration which is obtained when the subject has been detected, a subject forming a subject configuration which is different from at least a subject configuration when image-recording has previously been performed is detected.

5. The control apparatus according to claim 1, the circuitry is further configured to:
   decide a composition in accordance with a detected subject;
   make a decision for each of predetermined composition forming elements in order to decide the composition; and
   change, as a parameter, the composition forming elements to be used.

6. The control apparatus according to claim 4, wherein the circuitry is further configured to:
   make a decision for each of predetermined composition forming elements in order to decide the composition; and
   change, as a parameter, the composition forming elements to be used.

7. The control apparatus according to claim 1, wherein he circuitry is further configured to:
   decide a composition in accordance with a detected subject;
   determine whether or not the decided composition is obtained in an image based on the image data within a prescribed time;
   determine whether or not the decided composition has continuously been obtained in the image based on the image data for the prescribed time;
   perform the automatic image-recording as a result of determining that the decided composition is obtained within the prescribed time or as a result of determining that the decided composition has not continuously been obtained for the prescribed time; and
   change, as the parameter, the prescribed time to be used.

8. The control apparatus according to claim 1, the circuitry is further configured to:
   decide a composition in accordance with a detected subject detected by the subject detection means;
   determine whether or not the decided composition has been obtained in an image based on the image data;
   determine whether or not a prescribed time has elapsed when it is determined that the decided composition has been obtained;
   perform the automatic image-recording when a positive determination result is obtained; and
   change, as a parameter, the prescribed time to be used for the determination.

9. The control apparatus according to claim 1, the circuitry is further configured to:
   perform, as a result of detecting no, subject search control for changing an imaging field-of-view range so that a subject is to be detected;
   start the subject search control after the lapse of a predetermined wait time after the time when it has been determined that no subject has been detected; and
   change, as a parameter, the wait time to be used.

10. The control apparatus according to claim 1, wherein the circuitry is further configured to:

change and set the recording frequency in accordance with an operation.

11. The control apparatus according to claim 1, wherein the circuitry is further configured to:
change and set the recording frequency in accordance with a space of the storage medium.

12. The control apparatus according to claim 1, wherein the circuitry is further configured to:
change and set the recording frequency in accordance with whether the control apparatus is battery-driven or commercial-alternating-current power driven.

13. A control method for performing:
an image-recording control step of performing control so that automatic image-recording for automatically recording, on recording means, image data which has been obtained based on imaging by using an imaging unit is continuously and repeatedly performed;
a recording-frequency setting step of changing and setting a recording frequency, which is a frequency of the automatic image-recording performed by the image-recording control step;
a parameter changing/setting step of changing and setting one or more parameters related to the automatic image-recording based on the recording frequency set by the recording-frequency setting step;
detecting a subject which is present in an image based on the image data;
deciding a composition in accordance with the detected subject;
making a determination regarding whether or not the decided composition has continuously been obtained in the image based on the image data for a prescribed time;
performing the automatic image-recording as a result of a determination that the decided composition has continuously been obtained for the prescribed time; and
changing, as a parameter, the prescribed time to be used for the determination.

14. A non-transitory computer-readable medium storing computer readable instructions thereon that when executed by a computer cause the computer to perform a method comprising:
an image-recording control step of performing control so that automatic image-recording for automatically recording, on recording means, image data which has been obtained based on imaging by using an imaging unit is continuously and repeatedly performed;
a recording-frequency setting step of changing and setting a recording frequency, which is a frequency of the automatic image-recording performed by the image-recording control step;
a parameter changing/setting step of changing and setting a parameter related to the automatic image-recording in accordance with the recording frequency set by the recording-frequency setting step;
detecting a subject which is present in an image based on the image data;
deciding a composition in accordance with the detected subject;
making a determination regarding whether or not the decided composition has continuously been obtained in the image based on the image data for a prescribed time;
performing the automatic image-recording as a result of a determination that the decided composition has continuously been obtained for the prescribed time; and
changing, as a parameter, the prescribed time to be used for the determination.

* * * * *